(12) United States Patent
Jackson et al.

(10) Patent No.: US 8,923,281 B2
(45) Date of Patent: Dec. 30, 2014

(54) METHODS AND APPARATUS TO PERFORM CALL SCREENING IN A VOICE OVER INTERNET PROTOCOL (VOIP) NETWORK

(75) Inventors: James Jackson, Austin, TX (US); Niral S. Sheth, Austin, TX (US); Philip Cunetto, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 58 days.

(21) Appl. No.: 13/544,652

(22) Filed: Jul. 9, 2012

(65) Prior Publication Data

US 2012/0275451 A1 Nov. 1, 2012

Related U.S. Application Data

(63) Continuation of application No. 11/761,037, filed on Jun. 11, 2007, now Pat. No. 8,223,757.

(51) Int. Cl.
| | |
|---|---|
| *H04L 12/66* | (2006.01) |
| *H04M 11/00* | (2006.01) |
| *H04M 3/00* | (2006.01) |
| *H04M 3/436* | (2006.01) |
| *H04L 29/06* | (2006.01) |
| *H04M 7/00* | (2006.01) |

(52) U.S. Cl.
CPC ......... *H04L 65/1076* (2013.01); *H04L 65/1016* (2013.01); *H04M 2203/2011* (2013.01); *H04M 7/006* (2013.01); *H04L 65/1006* (2013.01); *H04M 3/436* (2013.01)
USPC ..................... 370/356; 379/88.17; 379/88.19; 379/196; 379/211.02

(58) Field of Classification Search
CPC . H04L 12/58; H04L 65/1016; H04L 65/1076; H04M 3/43; H04M 7/006; H04M 3/53308; H04M 3/533
See application file for complete search history.

(56) References Cited

U.S. PATENT DOCUMENTS

| | | | |
|---|---|---|---|
| 6,298,062 B1 | 10/2001 | Gardell et al. |
| 6,310,939 B1 | 10/2001 | Varney |
| 6,366,661 B1 | 4/2002 | Devillier et al. |
| 6,459,780 B1 | 10/2002 | Wurster et al. |
| 6,804,334 B1 | 10/2004 | Beasley et al. |
| 6,914,971 B1 | 7/2005 | Bruening |
| 7,075,922 B2 | 7/2006 | Mussman et al. |
| 7,103,167 B2 | 9/2006 | Brahm et al. |
| 7,123,697 B2 | 10/2006 | Amir et al. |

(Continued)

OTHER PUBLICATIONS

USPTO, "Office Action," issued in connection with U.S. Appl. No. 11/761,037 on Jul. 14, 2009 (15 pages).

(Continued)

*Primary Examiner* — Melanie Jagannathan
(74) *Attorney, Agent, or Firm* — Hanley, Flight & Zimmerman, LLC

(57) ABSTRACT

Methods and apparatus to perform call screening in a voice over Internet protocol (VoIP) network are disclosed. Disclosed example methods include receiving a call screening termination message at a feature server of an Internet protocol multimedia subsystem, initiating a communication session between a first user device operable with the Internet protocol multimedia subsystem and a second user device operable with the Internet protocol multimedia subsystem in response to the call screening termination message, the first and second user devices being involved in a call screening session, and releasing a signaling resource of a messaging server, the signaling resource having been used in the call screening session.

15 Claims, 13 Drawing Sheets

(56) References Cited

U.S. PATENT DOCUMENTS

| | | |
|---|---|---|
| 7,149,208 B2 | 12/2006 | Mattaway et al. |
| 7,187,759 B2 | 3/2007 | Patel et al. |
| 7,602,895 B2 | 10/2009 | Terry et al. |
| 8,116,302 B1 * | 2/2012 | Robbins ..................... 370/356 |
| 2003/0179743 A1 | 9/2003 | Bosik et al. |
| 2003/0215078 A1 * | 11/2003 | Brahm et al. ............ 379/211.02 |
| 2004/0240641 A1 | 12/2004 | Cohen et al. |
| 2005/0069101 A1 | 3/2005 | Bear et al. |
| 2005/0152515 A1 | 7/2005 | Amir et al. |
| 2005/0201362 A1 | 9/2005 | Klein et al. |
| 2006/0153354 A1 | 7/2006 | Brahm et al. |
| 2006/0165059 A1 | 7/2006 | Batni et al. |
| 2006/0268750 A1 | 11/2006 | Weiner |
| 2006/0274733 A1 | 12/2006 | Mussman et al. |
| 2007/0003032 A1 * | 1/2007 | Batni et al. ................. 379/88.19 |
| 2008/0165942 A1 * | 7/2008 | Provenzale et al. ...... 379/142.01 |
| 2008/0304471 A1 | 12/2008 | Jackson et al. |

OTHER PUBLICATIONS

USPTO, "Office Action," issued in connection with U.S. Appl. No. 11/761,037 on Feb. 1, 2010 (15 pages).

USPTO, "Office Action," issued in connection with U.S. Appl. No. 11/761,037 on Dec. 6, 2011 (14 pages).

USPTO, "Notice of Allowance," issued in connection with U.S. Appl. No. 11/761,037 on Mar. 19, 2012 (8 pages).

* cited by examiner

METHODS AND APPARATUS TO PERFORM CALL SCREENING IN A VOICE OVER INTERNET PROTOCOL (VOIP) NETWORK

RELATED APPLICATION(S)

This patent arises from a continuation of U.S. patent application Ser. No. 11/761,037, entitled "METHODS AND APPARATUS TO PERFORM CALL SCREENING IN A VOICE OVER INTERNET PROTOCOL (VOIP) NETWORK" and filed on Jun. 11, 2007, which is incorporated herein by reference in its entirety.

FIELD OF THE DISCLOSURE

This disclosure relates generally to voice over Internet protocol (VoIP) networks and, more particularly, to methods and apparatus to perform call screening in a VoIP network.

BACKGROUND

A traditional answering machine may be configured to allow a user (e.g., a called party) to listen to a message as it is being recorded by the answering machine. As the message is being recorded and listened to, the user can decide whether to answer to call (e.g., the user can screen calls). In a voice over Internet protocol (VoIP) network, the recording and/or playback of messages is performed by a voicemail and/or messaging server implemented by and/or within the VoIP network.

DETAILED DESCRIPTION

Figure 1:
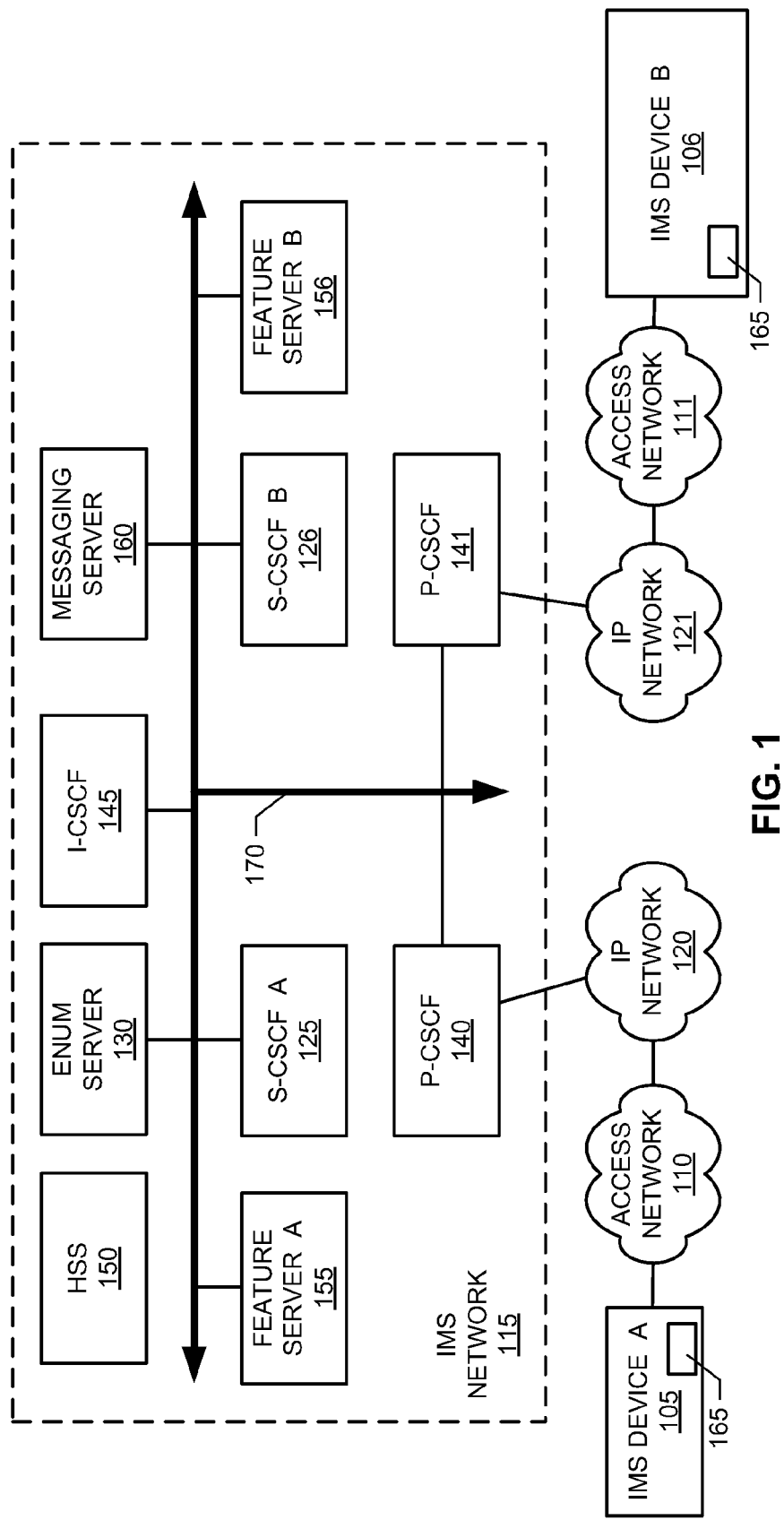
FIG. 1 is a schematic illustration of an example Internet Protocol (IP) Multimedia Subsystem (IMS) based voice over IP (VoIP) communication system constructed in accordance with the teachings of the invention.

Methods and apparatus to perform call screening in a voice over Internet protocol (VoIP) network are disclosed. A disclosed example method includes sending a call initiation request to a VoIP endpoint, receiving a call screening indication from a user of the VoIP endpoint in response to the call initiation request during and prior to a no-answer determination made by an initiating call server, and playing a message for the user while a calling party is leaving the message.

Another disclosed example method includes displaying a notification of an incoming communication session at a voice over Internet protocol (VoIP) communication device, and transmitting a call screening selection from the VoIP device while the notification is being displayed.

Yet another disclosed example method includes receiving a call screening termination message at an Internet protocol (IP) multimedia subsystem (IMS) feature server, initiating a communication session between a first IMS user device and a second IMS user device in response to the call screening termination message, the first and second IMS user device being involved in a call screening session, and releasing a signaling resource of a messaging server.

A disclosed example method of using a voice over Internet protocol (VoIP) device includes viewing a notification of an incoming communication session displayed at the communication device, and providing the communication device a call screening selection while the notification is being displayed.

A disclosed example voice over Internet protocol (VoIP) endpoint includes a display to provide a notification of an incoming call, an interface element to allow a user of the VoIP endpoint to indicate whether to perform call screening prior to a no-answer determination for the incoming call, and an output device to play a message provided by a calling party during call screening.

A disclosed example apparatus includes a session initiation protocol (SIP) interface to receive a call screening indication message from a first voice over Internet protocol (VoIP) endpoint, and to send a messaging session initiation message to a messaging server in response to the call screening indication message, and a call screening agent to receive a call screening termination message from the messaging server and to initiate a communication session between the first VoIP endpoint and a second VoIP endpoint in response to the call screening termination message to thereby release a signaling resource of the messaging server.

A disclosed example messaging server includes a messaging agent to receive a call screening initiation message for a communication session directed to a called party by a calling party, and a media handler to provide data received from the calling party to the messaging agent and to the called party, and to provide data received from the messaging agent to the calling party.

In the interest of brevity and clarity, throughout the following disclosure references will be made to the example Internet protocol (IP) Multimedia subsystem (IMS) based voice over IP (VoIP) communication system, the example IMS network 115, the example IP networks 120 and 121, the example access networks 110 and 111, the example feature servers 155 and 156, the example messaging server 160, and/or the example IMS devices 105 and 106 of FIG. 1. Moreover, the following disclosure will utilize SIP messages and/or message exchanges. However, it should be understood that the methods and apparatus described herein to perform call screening are applicable to other VoIP communication systems and/or networks (e.g., networks based on soft switches), VoIP devices, IMS devices, feature servers, messaging servers, access networks, IP networks, IMS networks and/or IMS communication systems, and/or other types of protocols, messages, and/or message exchanges.

FIG. 1 is a schematic illustration of an example IMS based VoIP communication system that includes any number and/or type(s) of IMS devices, two of which are designated at reference numerals 105 and 106. Example IMS devices 105 and 106 include, but are not limited to, an IMS (e.g., voice over Internet Protocol (VoIP)) phone, an IMS residential gateway, an IMS enabled personal computer (PC), an IMS endpoint, a wireless IMS device (e.g., a wireless-fidelity (WiFi) Internet protocol (IP) phone), an IMS adapter (e.g., an analog telephone adapter (ATA)), an IMS enabled personal digital assistant (PDA), and/or an IMS kiosk. The example IMS devices 105 and 106 of FIG. 1 may be implemented and/or be found at any number and/or type(s) of locations. Further, the IMS devices 105 and 106 may be fixed location devices, substantially fixed location devices and/or mobile devices. Moreover, the IMS devices 105 and 106 may have equipment communicatively and/or electrically coupled to them. For example, an IMS ATA may be coupled to a telephone, and/or an IMS residential gateway may be coupled to a PC and/or set-top box. Example manners of implementing any or all of the example IMS devices 105 and 106 of FIG. 1 are described below in connection with FIGS. 2A and 2B.

To access IMS communication services throughout and/or within a site, location, building, geographic area and/or geographic region, the example IMS communication system of FIG. 1 includes any number and/or type(s) of access networks, two of which are designated in FIG. 1 with reference numbers 110 and 111. In general, the example access networks 110 and 111 provide and/or facilitate a communicative coupling of the IMS devices 105 and 106 to and/or with an IMS network 115, which provides and/or enables IMS communication services (e.g., telephone services, Internet services, data services, messaging services, instant messaging services, electronic mail (email) services, chat services, video services, audio services, gaming services, voicemail, facsimile services, etc.) to the IMS device 105 and 106. However, in some examples, one or more of the IMS devices 105 and 106 may access the IMS network 115 without use of an access network 110, 111. The example access networks 110 and 111 can be implemented using any number and/or type(s) of past, present and/or future standards, specifications, communication devices, networks, technologies and/or systems, such as public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combinations and/or hybrids of these devices, systems and/or networks.

While in the illustrated example of FIG. 1, each of the example IMS devices 105 and 106 are depicted as having an associated access network 110, 111, such depictions are merely illustrative. For example, the example IMS devices 105 and 106 may utilize a common access network 110, 111, an IMS device 105 and 106 may be configured and/or capable to utilize more than one access network 110, 111 at the same and/or different times, an IMS device 105 and 106 may be configured to access the IMS network 115 directly or via the IP network 120 without an intervening access network 110, etc.

To provide communication services, the example IMS based VoIP communication system of FIG. 1 includes one or more IMS networks, one of which is designated in FIG. 1 with reference numeral 115. As described more fully below, the example IMS network 115 of FIG. 1 implements, performs and/or includes, in addition to other things, call screening methods and/or apparatus that allow subscribers of the IMS network 115 to select, at an IMS device 105, 106 and/or on a call-by-call basis (e.g., for each call), whether to screen an incoming communication session (e.g., an incoming telephone call). That is, while each incoming communication session is being established to an IMS device 105, 106, a user of the IMS device 105, 106 can make and/or provide a call screening selection to the IMS network 115. When a user selects that an incoming communication session is to be screened, the IMS network 115 bridges the information provided by a calling party to the IMS device 105, 106 while the calling party is recording and/or providing a message. While the user of the IMS device 105, 106 is screening the message being left, recorded and/or provided by the calling party, the user can make and/or provide one or more messaging handling indications and/or selections. For example, the user can indicate that the message is to be deleted once the entire message has been recorded, the user can indicate that the message is to be forwarded to another subscriber, the user can indicate that the user is to be connected to the messaging server, etc. Additionally or alternatively, the user can indicate that they desire to be connected to the calling party, thereby terminating the currently ongoing call screening communication session(s). When call screening is terminated by the illustrated example IMS network 115 of FIG. 1, all resources (e.g., signaling, media and/or otherwise) of a messaging server (e.g., the example messaging server 160) related to the terminated call screening communication session(s) are released, and the calling and called parties communicate directly without the involvement of the messaging server. As used herein, the terms "screen", "call screening," and "screening" refer listening to a message (e.g., a voicemail message) while the message is being recorded, left and/or provided by a calling party. Moreover, the term "call screening communication session" refers to a communication session by which a called party listens and/or accesses a message as it is being recorded, left and/or provided by the calling party via a different communication session.

In contrast to the above system, in traditional IMS networks, call screening decisions and/or selections cannot be made on a call-by-call basis. For example, a user must configure a traditional IMS network to screen all of their incoming calls. In the absence of being able to make a per-call screening selection, either all calls are screened (including cases when the called party is actually unavailable) or all calls are not screened. However, such behavior is generally not satisfactory to users, and/or places an excessive and/or undesirable processing and/or resource(s) load on messaging servers. Further, in traditional IMS networks, a call screening communication session can be inadvertently forwarded back to the messaging server if a call screening communication session request initiating the call screening communication session is not accepted and/or answered by the called party. While traditional IMS networks may allow a user to terminate a call screening communication session, traditional IMS networks do not allow users to provide and/or indicate message handling selections (e.g., automatically delete) while the message is still being recorded. Moreover, when a call screening communication session is terminated in a traditional IMS network, resources of a messaging server are still consumed even though the calling and called parties are now communicating directly and even though a message is no longer being recorded by the messaging server. For at least these reasons, traditional IMS networks place excessive and/or undesirable processing and/or resource(s) loads on messaging servers and/or the IMS network, and/or do not provide a satisfactory and/or desirable user experience. As described more fully below, the methods and apparatus to perform call screening in IMS networks described herein provide a more flexible, capable and/or powerful user experience while consuming considerably less messaging server and/or IMS network resources.

In the example IMS communication system of FIG. 1, the example IMS devices 105 and 106 are communicatively coupled to the example IMS network 115 via one or more of the example access networks 110 and/or 111, and/or any number and/or type(s) of private and/or public IP based communication networks such as, for example, the Internet, two of which are illustrated in FIG. 1 with reference numerals 120 and 121. While in the illustrated example of FIG. 1, each of the example IMS devices 105 and 106 are depicted as having an associated IP network 120, 121, such depictions are merely illustrative. For example, the example IMS devices 105 and 106 may utilize the same public IP network, an IMS device 105 and 106 may be configured and/or capable to utilize more than one IP network 120, 121 at the same and/or different times, etc. In general, the example IP networks 120 and 121 of FIG. 1 provide and/or facilitate a communicative coupling of the IMS devices 105 and 106 to and/or with the IMS network 115.

In some examples, the IMS devices 105 and 106 may be communicatively coupled to the access networks 110 and 111 via one or more additional IP based networks and/or devices (not shown), such as a local area network (LAN), a gateway and/or a router located within a place of business, a school and/or a residence. The example IMS devices 105 and 106 of FIG. 1 are communicatively coupled to the example access networks 110 and 111, the example IP networks 120 and 121 and/or, more generally, the example IMS network 115 via any number and/or type(s) of past, current and/or future communication network(s), communication system(s), communication device(s), transmission path(s), protocol(s), technique(s), specification(s) and/or standard(s). For instance, the example IMS devices 105 and 106 may be coupled to the example access networks 110 and 111, the example IP networks 120 and 121, and/or the example IMS network 115 via any type(s) of voice-band modem(s), digital subscriber line (DSL) modem(s), cable modem(s), Ethernet transceiver(s), optical transceiver(s), IP virtual private network (VPN) connection(s), Institute of Electrical and Electronics Engineers (IEEE) 802.11x (a.k.a. WiFi) transceiver(s), IEEE 802.16 (a.k.a. WiMax), wireless local area network (WLAN) access point(s), general packet radio services (GPRS) networks in 3G wireless networks, etc. Moreover, any or all of the example IMS network 115, the example access networks 110 and 111, and/or the example IP networks 120 and 121 of FIG. 1 may extend geographically to include one or more locations near to and/or encompassing one or more of the IMS devices 105 and 106. For example, the access network 110 may include a wireless access point (not shown) by which, for example, a WiFi IP phone 105 connects to the IP network 120 and the IMS network 115.

In the example IMS communication system of FIG. 1, the example access networks 110 and 111, the example IP networks 120 and 121, and the IMS network 115 need not be owned, implemented, and/or operated by a single service provider. For example, the IMS devices 105 and 106 may access IMS services provided by an IMS network 115 owned, operated and/or implemented by a first service provider via access networks 110 and 111, which are owned, operated and/or implemented by one or more additional service providers. However, any or all of the access networks 110 and 111, the IMS network 115 and/or the IP networks 120 and 121 may be operated by the same service provider.

In the illustrated example IMS communication system of FIG. 1, each IMS device (e.g., the example IMS devices 105 and 106) that is registered to the example IMS network 115 is associated with and/or assigned to a serving call session control function (S-CSCF) server (two of which are designated in FIG. 1 with reference numerals 125 and 126). The example S-CSCF servers 125 and 126 of FIG. 1 are responsible for handling incoming and/or outgoing IMS communication sessions (e.g., telephone calls, and/or data and/or video sessions) associated with its registered IMS devices 105 and 106.

While two S-CSCF servers 125 and 126 are illustrated in FIG. 1, the IMS network 115 may include any number and/or type(s) of S-CSCF servers, and each such S-CSCF server may support any number and/or type(s) of IMS devices 105 and 106. The example S-CSCF servers 125 and 126 of FIG. 1 perform session control, maintain session states and/or enable communications with call feature servers (e.g., the example application servers 155-157 of FIG. 1) for its associated and/or registered IMS devices 105 and 106. For instance, when the calling IMS device A 105 initiates, for example, an outgoing telephone call to the example IMS device B 106, a communication session initiation message (e.g., a SIP INVITE message) is routed by the IMS network 115 from the IMS device A 105 to the S-CSCF server A 125 associated with that particular IMS device A 105.

In response to the communication session initiation message, the example S-CSCF server A 125 sends an ENUM query request message to a tElephone NUMber mapping (ENUM) server 130 to obtain an identifier (e.g., a SIP uniform resource identifier (URI)) for the IMS device B 106. The identifier obtained from the example ENUM server 130 is used by the S-CSCF server A 125 to establish the requested communication session.

To provide an access entry point for an IMS device 105 and 106 into the IMS network 115, the example IMS network 115 of FIG. 1 includes any number and/or type(s) of proxy call session control function (P-CSCF) servers, two of which are designated in FIG. 1 with reference numerals 140 and 141. The example P-CSCF servers 140 and 141 of FIG. 1, among other things, route SIP messages between IMS devices 105 and 106 and their associated S-CSCF servers 125 and 126.

To locate and/or identify the S-CSCF server 125 and 126 associated with an IMS device 105 and 106, the example IMS network 115 of FIG. 1 includes any number and/or type(s) of interrogating call session control function (I-CSCF) servers, one of which is designated in FIG. 1 with reference number 145. The example I-CSCF server 145 of FIG. 1 serves as a contact point within the example IMS network 115 for connections destined for an IMS device 105 and 106 of the IMS communication system, and/or for an IMS device 105 and 106 currently located within the serving area of the IMS communication system (e.g., a roaming subscriber). For example, for a destination identified by the example ENUM server 130, the example I-CSCF 145 identifies to which S-CSCF server 125, 126 the final destination IMS device 105 and 106 is registered. IMS protocol messages (e.g., SIP messages) directed to the destination IMS device 105 and 106 are then routed to the S-CSCF server 125 and 126 identified by the I-CSCF 145.

To manage subscriber information, and/or to enable subscribers and/or servers to locate other servers, subscribers and/or destinations, the example IMS network 115 of FIG. 1 includes any number and/or type(s) of home subscriber server(s) (HSSs), one of which is designated in FIG. 1 with reference numeral 150. The example HSS 150 of FIG. 1 maintains a device profile and/or one or more preferences for each subscriber and/or IMS device 105 and 106 of the IMS network 115. The example I-CSCF server 145 of FIG. 1 uses information contained in the HSS 150 to, for example, determine and/or locate the S-CSCF server 125 and 126 associated with a particular subscriber and/or IMS device 105 and 106.

To provide one or more additional call features, the example IMS network 115 of FIG. 1 includes any number and/or type(s) of application servers, two of which are designated in FIG. 1 with reference numerals 155 and 156. The example application servers 155 and 156 of FIG. 1 (also referred to herein as "feature servers") provide and/or implement additional service features to subscribers (e.g., call barring, calling name delivery and/or blocking, call blocking, call forward, call busy transfer, call screening, call forking, call trace, voicemail, announcement servers, call trees, etc.). Example application servers 155 and 156 include, but are not limited to, voice over Internet protocol (VoIP) feature servers. The application servers 155 and 156 may be used to provide and/or implement call features and/or services for calling and/or called parties. An example manner of implementing any or all of the example feature servers 155 and 156 of FIG. 1 is described below in connection with FIG. 3.

In addition to any traditional feature server functions, any or all of the example feature servers 155 and 156 of FIG. 1 may perform one or more functions that enable a more flexible, capable and/or powerful call screening user experience while allowing messaging servers (e.g., the example messaging server 160) and/or, more generally, the IMS network 115 to consume considerably less resources (e.g., processing, communication and/or otherwise). For example, when a user of an IMS device 105, 106 selects and/or indicates that call screening is to be performed for a particular incoming communication session, the IMS device 105, 106 notifies the feature server 155, 156 handling call features for the IMS device 105, 106 of the call screening selection (e.g., by sending the example SIP NOTIFY message of FIG. 5 to the feature server 155, 156). The example feature server 155, 156 of FIG. 1 forwards the incoming communication session to a messaging server (e.g., the example messaging server 160) and indicates to the messaging server that call screening is to be performed (e.g., by sending the example SIP protocol message of FIG. 6). In response to the call screening notification, the messaging server initiates call screening to allow the user to listen to a message while the message is being left, recorded and/or provided by a calling party (e.g., by sending the example SIP INVITE message of FIG. 7 to the IMS device 105, 106). When a user indicates to the messaging server during call screening that they desire to be connected with the calling party, the messaging server notifies the example feature server 155, 156 (e.g., by sending the example SIP REFER message of FIG. 8 to the feature server 155, 156) that call screening is to be terminated. The feature server 155, 156 directs and/or causes the IMS device 105, 106 and the calling device to begin communicating directly (e.g., by sending a SIP RE-INVITE message to the IMS device 105, 106 and to the calling device). The example feature server 155, 156 of FIG. 1 terminates the call screening communication session(s) such that no additional resources (e.g., signaling, media and/or otherwise) of the messaging server are required for the continuing communication between the calling and called parties.

To collect, record, store, retrieve and/or access messages left by and/or for subscribers of the IMS network 115, the IMS network 115 includes one or more messaging servers, one of which is designated in FIG. 1 with reference numeral 160. When notified that call screening is to be performed for a particular requested (but not yet established) communication session, the example messaging server 160 of FIG. 1 establishes a first communication session with the calling party (e.g., one of the example IMS device 105 and 106), and a second communication session with the called device (e.g., one of the example IMS device 105 and 106). The example messaging server 160 initiates the second communication session (e.g., by sending the example SIP INVITE message of FIG. 7) such that the second communication session cannot be forwarded (e.g., back to the messaging server 160) and such that the called device automatically answers and/or automatically establishes the second communication session. The called device automatically answers and/or automatically establishes the second communication session without any involvement of the user of the called device (e.g., without them having to press any button(s) of the called device). The example messaging server 160 also initiates the second communication session such that the second communication session is handled and/or processed by the same media handler of the messaging server 160 (e.g., any of the example media handlers 425 and 426 of FIG. 4) that is also processing and/or handling the first communication session. The example media handler provides media data received from the calling device via the first communication session to both the called device via the second communication session and to a messaging agent of the messaging server 160 (e.g. the example messaging agent 415 of FIG. 4) that is recording a message being left by the calling party. The example media handler also routes data sent by the messaging agent for the calling device to the calling device via the first communication session. Likewise, the media handler routes data received from the called device via the second communication session to the messaging agent. In this way, the media handler performs "bridging" such that the called device can simultaneously a) review a message as it is being left, recorded and/or provided by the calling party, and b) interact with the messaging agent to provide and/or make one or more message handling selections.

The example messaging server 160 responds to message and/or call screening handling selections made and/or provided by the called device (e.g., by decoding dual-tone multiple-frequency (DTMF) signals received from the called device). For example, the user of the called device can indicate that the message is to be automatically deleted by the messaging server 160 once the message is complete, the user of the called device can indicate that the message is to be forwarded once the message is complete, the user of the called device can request to be connected via a traditional messaging communication session to the messaging server 160, etc. Additionally or alternatively, the user of the called device can request to communicate directly with the calling party. In the latter example, the example messaging server 150 instructs the feature server 155, 156 (e.g., by sending the example SIP REFER message of FIG. 8 to the feature server 155, 156), which originally forwarded the calling party to the messaging server 160, to initiate a communication session between the calling and called device such that the communication session does not involve and/or require any resources (e.g., signaling, media and/or otherwise) of the messaging server 160. An example manner of implementing the example messaging server 160 of FIG. 1 is described below in connection with FIG. 4.

To allow a user of an IMS device 105, 106 to make and/or provide call screening and/or message handling selections and/or indications, either or both of the example IMS devices 105, 106 of FIG. 1 includes one or more user interface elements 165. The example user interface elements 165 of FIG. 1 allow a user of the IMS device 105, 106 to view information regarding an incoming communication session (e.g., callerID information), to indicate that the communication session is to be screened (e.g., by pressing a key and/or button), and/or to indicate (e.g., by pressing a key and/or button) during call screening how the call screening session is to be disposed (e.g., message automatically deleted, called user connected to messaging server 160, and/or called user connected to calling party). Example user interface elements 165 include, but are not limited to, a screen, a button (e.g., of a numeric keypad), a key, a soft key and/or a touch-sensitive screen.

As illustrated in FIG. 1, the example S-CSCF servers 125 and 126, the example ENUM server 130, the example P-CSCF servers 140 and 141, the example I-CSCF server 145, the example HSS 150, the example feature servers 155 and 156 and/or the example messaging server 160 communicate and/or are communicatively coupled via any number, type(s) and/or combination of communication paths, communication networks, busses and/or communication devices 170.

While an example IMS communication system, example IMS devices 105 and 106, and an example IMS network 115 have been illustrated in FIG. 1, the devices, networks, systems, servers and/or processors illustrated in FIG. 1 may be combined, divided, re-arranged, eliminated and/or implemented in any way. For example, it will be readily appreciated by persons of ordinary skill in the art that the example S-CSCF servers 125 and 126, the example ENUM server 130, the example P-CSCF servers 140 and 141, the example I-CSCF server 145, the example HSS 150, the example feature servers 155 and 156, and/or the example messaging servers 160 illustrated in FIG. 1 are logical entities of the example IMS network 115. They may, therefore, be implemented separately and/or in any combination using, for example, machine accessible instructions executed by one or more computing devices and/or computing platforms (e.g., the example processing platform 1400 of FIG. 14). Further, the example IMS devices 105 and 106, the example S-CSCF servers 125 and 126, the example ENUM server 130, the example P-CSCF servers 140 and 141, the example I-CSCF server 145, the example HSS 150, the example feature servers 155 and 156, the example messaging servers 160, the user interface elements 165 and/or, more generally, the example IMS network 115 may be implemented by hardware, software, firmware and/or any combination of hardware, software and/or firmware. Further still, the example IMS communication system, the example IMS devices 105 and 106 and/or the example IMS network 115 may include additional devices, servers, systems, networks, gateways, portals, and/or processors in addition to, or instead of, those illustrated in FIG. 1, and/or may include more than one of any or all of the illustrated devices, servers, networks, systems, gateways, portals, and/or processors. For example, an IMS network 115 may include any number and/or type(s) of media gateways, media gateway control function (BGCF) servers, breakout gateway control function (BGCF) severs and/or session border controllers.

Figure 2A:
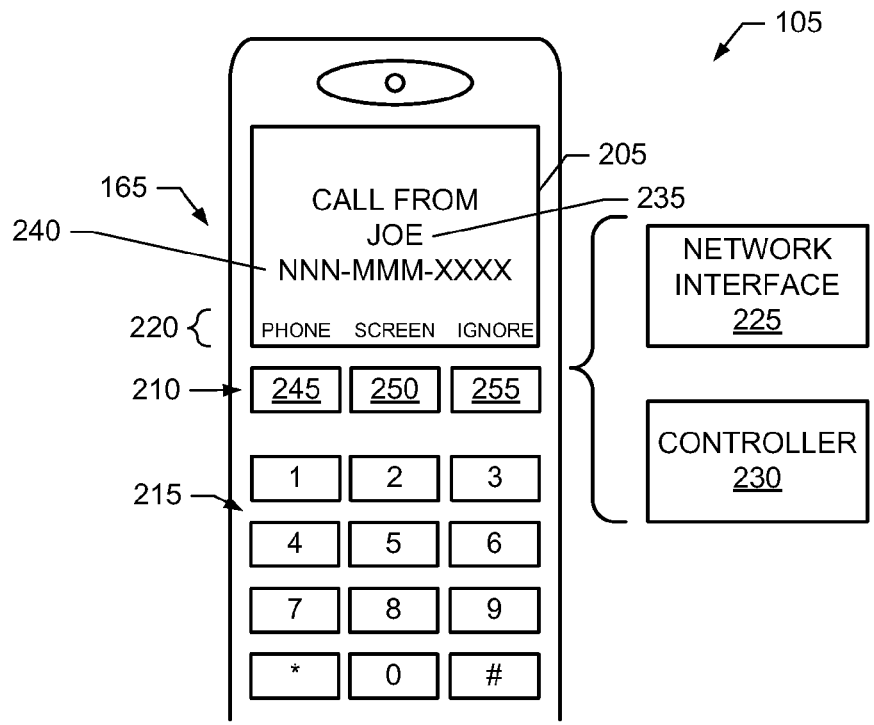
FIGS. 2A and 2B illustrate example manners of implementing any or all of the example IMS devices of FIG. 1.
Figure 2B:
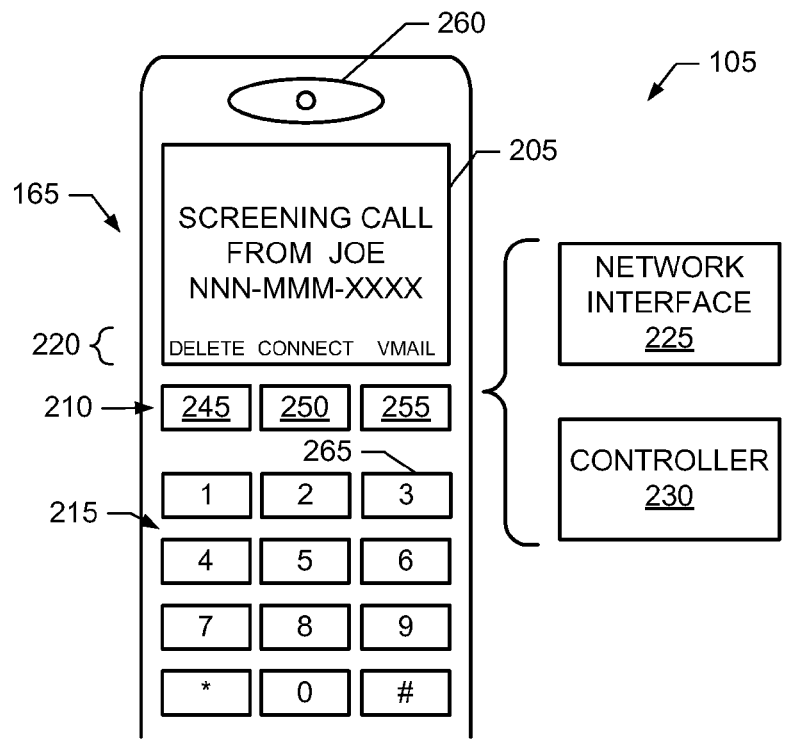

FIGS. 2A and 2B illustrate example manners of implementing any or all of the example IMS devices 105 and 106 of FIG. 1. While any or all of the example IMS devices 105 and 106 of FIG. 1 may be represented by the example devices of FIGS. 2A and 2B, for ease of discussion, the example devices of FIGS. 2A and 2B will be referred to as IMS device 105. Because many elements of the example IMS devices 105 of FIGS. 2A and 2B are identical, the description of the identical elements is presented only once in connection with FIG. 2A. To facilitate the understanding of FIG. 2B, identical elements are illustrated with identical reference numerals in FIGS. 2A and 2B. Thus, a reader interested in FIG. 2B is referred to the descriptions of identical elements presented in connection with FIG. 2A for a complete description of those like numbered elements.

To allow a user to interact with the example IMS device 105 of FIG. 2A, the IMS device 105 includes any number and/or type(s) of user interface elements 165. The example user interface elements 165 of FIG. 2A include, but are not limited to, a display 205, one or more keys and/or buttons 210, and/or a keypad 215. The example keys and/or buttons 210 of FIG. 2A are so called "soft keys" that have and/or may be assigned different functions and/or purposes depending upon a state of the IMS device 105. In the illustrated example of FIG. 2A, the current purpose of the example keys 210 is displayed above each key 210 in a lower portion 220 of the example display 205.

To communicate with an IMS network (e.g. the example IMS network 115 of FIG. 1) directly and/or via any or all of a modem, a transmitter, a receiver, a transceiver, an access network and/or an IP network, the example IMS device 105 of FIG. 2A includes a network interface 225. The example network interface 225 of FIG. 2A is used to send media data to the IMS network, to receive media data from the IMS network, to receive messages (e.g., a SIP protocol message) from the IMS network, and/or to send messages (e.g., a SIP protocol message) to the IMS network. An example network interface 225 is implemented in accordance with one or more past, present and/or future communication standards and/or specifications such as, for example, the Institute of Electrical and Electronics Engineers (IEEE) 802.3x family of standards and/or the 802.11x family of standards.

To control the overall operation of the example IMS device 105 of FIG. 2A, the IMS device 105 includes a controller 230. Based on media data and/or protocol messages received from the IMS network, the example controller 230 adjusts the state and/or operation of the IMS device 105. For example, if a communication session initiation request message (e.g., a SIP INVITE message) is received, the controller 230 can interact with the IMS network via the example network interface 225 to establish the requested communication session. The example controller 230 can, additionally or alternatively, send a communication session initiation request message (e.g., a SIP INVITE message) to initiate a communication session selected and/or specified by a user of the IMS device 105 (e.g., by pressing one or more keys of the example keypad 215 to enter a telephone number). In addition to other functions, the example controller 230 of FIG. 2A implements, performs and/or includes a SIP user agent.

Although for ease of illustration, the example network interface 225 and controller 230 are shown external to the IMS device 105, typically the network interface 225 and the controller 230 will be located internal to the IMS device 105.

In the illustrated example of FIG. 2A, the controller 230 has received a notification of an incoming communication session (e.g., by receiving a SIP INVITE message via the network interface 225). In response to the notification, the example controller 230 displays information regarding the incoming communication session on the display 205. For example, by displaying a calling party name 235 and a telephone number 240. The controller 230 also defines the example soft keys 210 to allow a user of the IMS device 105 to indicate and/or select whether call screening is to be performed for the incoming communication session. For example, an example soft key 245 can be pressed to answer the incoming telephone call, an example soft key 250 can be pressed to request call screening, and an example soft key 255 can be pressed to stop the IMS device 105 ringing and route the communication session directly to voicemail without call screening being performed. If the soft key 245 or the soft key 255 is pressed, or if the user does not press any buttons, keys, etc., the example controller 230 of FIG. 2A performs traditional call session control processing. However, if the example soft key 250 is pressed, the example controller 230 notifies the feature server (e.g., one of the example feature servers 155, 156 of FIG. 1) that the user has selected call screening for the incoming communication session (e.g., by sending the example SIP NOTIFY message of FIG. 5 to the feature server). In response to the call screening selection, the feature server forwards the incoming communication session to a messaging platform (e.g., the example messaging platform 160) (e.g., by sending the example SIP INVITE message of FIG. 6 to the messaging platform).

Figure 6:
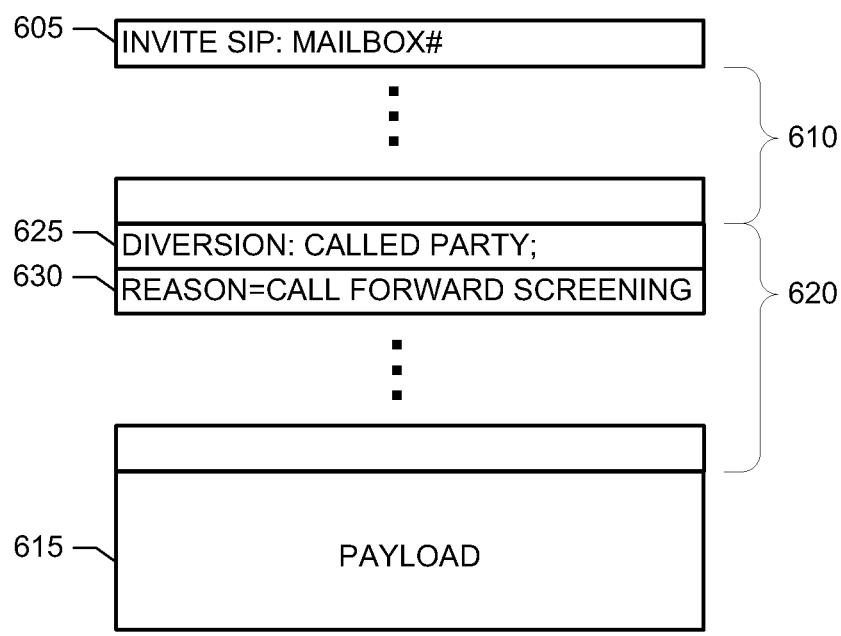
Figure 7:
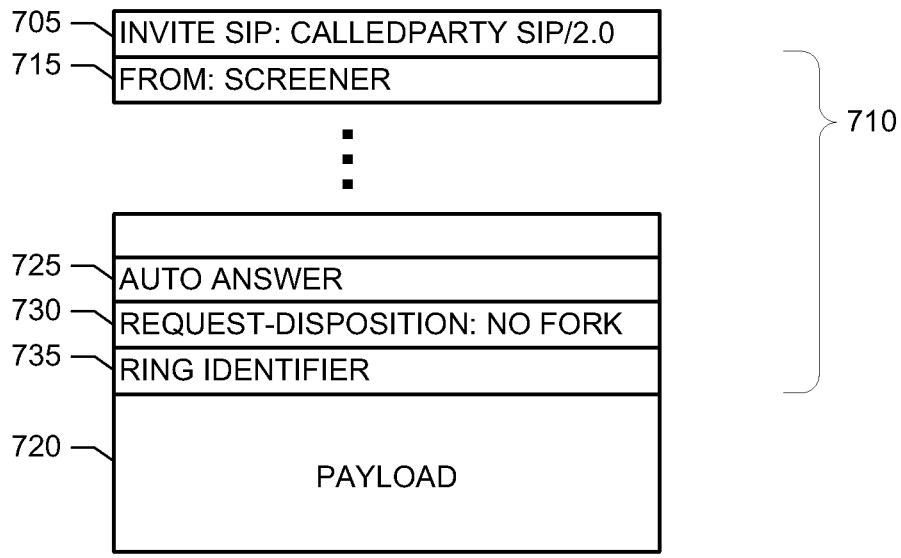

When the messaging platform receives the forwarded incoming communication session (e.g., receives the example SIP INVITE message of FIG. 6), the messaging platform initiates a call screening communication session to the IMS device 105 (e.g., sends the example SIP INVITE message of FIG. 7 to the IMS device 105). The messaging platform of the illustrated example initiates the call screening communication session such that the IMS device 105 automatically answers and establishes the call screening communication session without requiring any action and/or intervention on the part of a user of the IMS device 105. Upon, establishment of the call screening communication session, the IMS device 105 of FIG. 2A transitions to, for example, a state illustrated in FIG. 2B.

The example controller 230 of FIG. 2A may be one or more of any type(s) of processors such as, for example, a microprocessor, a processor core, a microcontroller, a digital signal processor (DSP), a DSP core, an advanced reduced instruction set computing (RISC) machine (ARM) processor, etc. The example controller 230 executes coded instructions which may be present in a main memory of the controller 230 (e.g., within a random-access memory (RAM) and/or a read-only memory (ROM)) and/or within an on-board memory of the controller 230. The example controller 230 may carry out, among other things, the example protocol message exchanges and/or the example machine accessible instructions illustrated in FIGS. 9, 10A-C and/or 11.

The example IMS device 105 of FIG. 2B illustrates an example IMS device 105 during a call screening communication session. To allow a user of the example IMS device 105 of FIG. 2B to review a message currently being left, recorded and/or provided by a calling party, the example IMS device 105 includes one or more output devices, such as a speaker 260 and/or the display 205. For example, if the calling party is leaving a voice message, the example controller 230 receives media data representative of the message (as it is being left by the calling party) via the network interface 225 and can output the same via the speaker 260. Likewise, if the calling party is leaving a text, image and/or video message, the example 230 receives media data representative of the message (as it is being left by the calling party) via the network interface 225 and outputs the same via, for example, the display 205. Thus the user of the IMS device 105 can review a message at substantially the same it is being left by a calling party via one or both of the example output devices 205 and/or 260.

Because the example IMS device 105 of FIG. 2B is in a different state than the example IMS device 105 of FIG. 2A, the example display 205 and/or the definition of the soft keys 210 are different than those illustrated in FIG. 2A. In particular, the example display 205 of FIG. 2B indicates that call screening is active, and the example soft keys 210 of FIG. 2B are defined to allow a user of the IMS device 105 to make and/or provide a message handling selection and/or indication. In the illustrated example of FIG. 2B, the soft key 245 is defined to indicate to the messaging platform that the message is to be automatically deleted once the message is completed, the soft key 250 is defined to indicate that the user desires to be connected with the calling party (e.g., to break into the message leaving session), and the soft key 255 is defined to indicate that the user desires to be connected to the messaging server in a traditional messaging communication session (e.g., after the message is left by the calling party). In the illustrated example of FIG. 2B, the soft keys 245, 250 and 255 cause the example controller 230 to send a corresponding DTMF signal to the messaging server via the call screening communication session's media stream. The messaging server interprets the received DTMF signal to determine and/or identify the user's message handling selection. Additionally or alternatively, the message handling selection can be sent to the messaging server via a control and/or protocol message (e.g., a SIP NOTIFY message). While in the illustrated example of FIG. 2B, the soft keys 245, 250 and 255 are used to provide a messaging handling indication, other elements of the user interface 165 may, additionally or alternatively, be used to indicate a messaging handling selection. For example, the keypad 215 may be used (e.g., by pressing a key 265 to indicate that the message should be deleted) to send a DTMF signal that represents the messaging handling selection to the messaging server without the involvement of the example controller 230.

While example manners of implementing any or all of the example IMS devices 105 and 106 of FIG. 1 have been illustrated in FIGS. 2A and 2B, one or more of the interface elements, data structures, elements, processes and/or devices illustrated in FIGS. 2A and/or 2B may be combined, divided, re-arranged, omitted, eliminated and/or implemented in any other way. Further, the example user interface elements 165, the example screen 205, the example keys 210, the example keypad 215, the example network interface 225, the example controller 230 and/or, more generally, the example IMS device 105 may be implemented by hardware, software, firmware and/or any combination of hardware, software and/or firmware. Further still, the example IMS device 105 may include interface elements, data structures, elements, processes and/or devices instead of, or in addition to, those illustrated in FIGS. 2A and/or 2B and/or may include more than one of any or all of the illustrated interface elements, data structures, elements, processes and/or devices.

Figure 3:
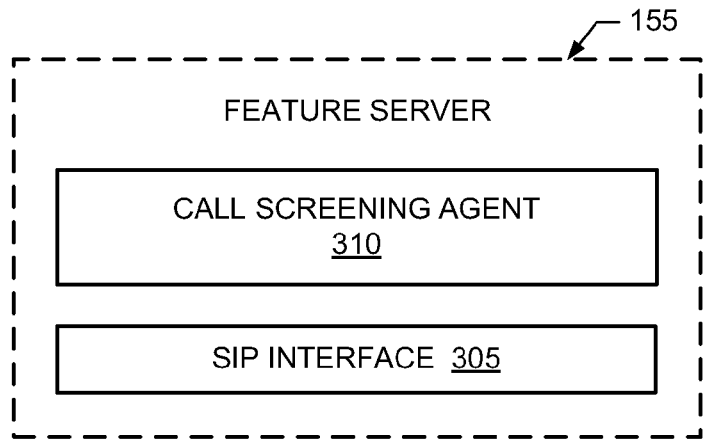
FIG. 3 illustrates an example manner of implementing any or all of the example feature servers of FIG. 1.

FIG. 3 illustrates an example manner of implementing any or all of the example feature servers 155 and 156 of FIG. 1. While any or all of the example feature servers 155 and 156 of FIG. 1 may be represented by FIG. 3, for ease of discussion, the device of FIG. 3 will be referred to as feature server 155. To allow the example feature server 155 of FIG. 3 to operate as a SIP feature server, the example feature server 155 includes a SIP interface 305. The example SIP interface 305 of FIG. 3 allows the feature server 155 to exchange (e.g., send and/or receive) any type of SIP messages with other device(s) and/or server(s) of the example IMS communication system of FIG. 1 (e.g., any of the example S-CSCF servers 125 and 126, the example messaging platform 160, and/or any of the example IMS devices 105 and 106).

To enable call screening, the example feature server 155 of FIG. 3 includes a call screening agent 310. The example feature server 155 may include one or more additional call feature agents to enable other call features (e.g., call forwarding, call blocking, etc.). The example call screening agent 310 of FIG. 3 receives call screening selections from IMS devices for respective requested communication sessions (e.g., by receiving the example SIP NOTIFY message of FIG. 5) and, in response, forwards the incoming communication session to a messaging server (e.g., the example messaging server 160) and indicates to the messaging server that call screening is to be performed (e.g., by sending the example SIP protocol message of FIG. 6).

When a user indicates to the messaging server during call screening that they desire to be connected with the calling party, the messaging server notifies the example call screening agent 310 of FIG. 2 (e.g., with the example SIP REFER message of FIG. 8) that call screening is to be terminated. In response to the call screening termination notification, the example call screening agent 310 directs and/or causes the IMS device 105, 106 and the calling device to begin communicating directly (e.g., by sending a SIP RE-INVITE message to the called IMS device 105, 106 and to the calling device 106, 105). The call screening agent 310 terminates the call screening communication session(s) such that no additional resources (e.g., signaling, media and/or otherwise) of the messaging server are required for the continuing communication between the calling and called parties.

While an example manner of implementing any or all the example feature servers 155 and 156 of FIG. 1 has been illustrated in FIG. 3, one or more of the interfaces, elements, processes and/or devices illustrated in FIG. 3 may be combined, divided, re-arranged, omitted, eliminated and/or implemented in any other way. For example, the feature server 155 may be implemented by modifying, updating and/or enhancing a traditional and/or existing feature server by the addition of one or more functions of the example call screening agent 310. Further, the example SIP interface 305, the example call screening agent 310 and/or, more generally, the example feature server 155 may be implemented by hardware, software, firmware and/or any combination of hardware, software and/or firmware. Further still, the example feature server may include interfaces, elements, processes and/or devices instead of, or in addition to, those illustrated in FIG. 3 and/or may include more than one of any or all of the illustrated interfaces, elements, processes and/or devices.

Figure 4:
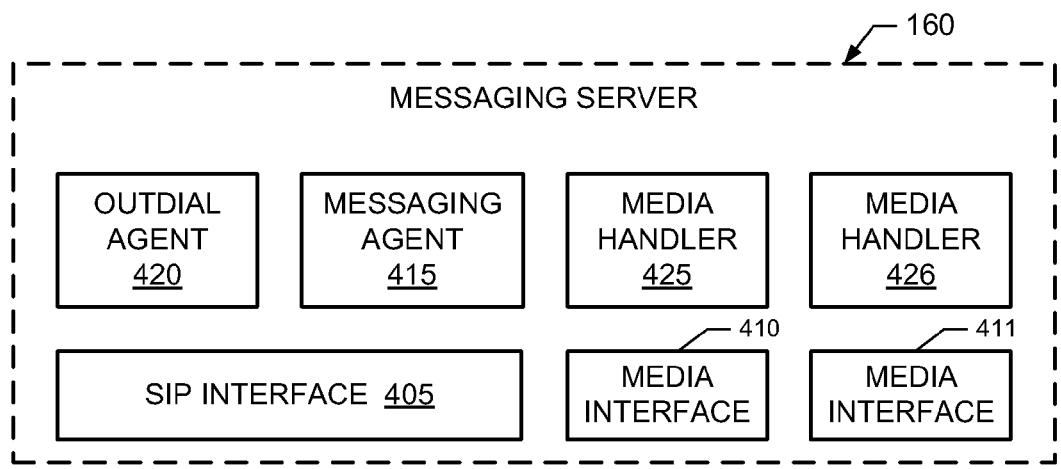
FIG. 4 illustrates an example manner of implementing the example messaging server of FIG. 1.

FIG. 4 illustrates an example manner of implementing example messaging server 160 of FIG. 1. To allow the example messaging server 160 of FIG. 4 to process SIP messages, the example messaging server 160 includes a SIP interface 405. The example SIP interface 405 of FIG. 4 allows the messaging server 160 to exchange (e.g., send and/or receive) any type of SIP messages with one or more other device(s) and/or server(s) of the example IMS communication system of FIG. 1 (e.g., any of the example S-CSCF servers 125 and 126, any or all of the example feature servers 155 and 156, and/or any of the example IMS devices 105 and 106).

To allow the example messaging server 160 of FIG. 4 to process media stream data, the messaging server 160 includes one or more media interfaces, two of which are designated in FIG. 4 with reference numerals 410 and 411. Using any suitable protocol(s), frame(s), packet(s) and/or format(s), the example media interfaces 410 and 411 of FIG. 4 receive media streams from other portions of an IMS network (e.g., the example IMS network 115 of FIG. 1) and/or transmit media streams to other portions of the IMS network. The example media interfaces 410 and 411 may, additionally or alternatively, perform conversion(s) between encoding formats used by other portions of the IMS network and the messaging server 160.

To perform call screening, and/or collect, record, store, retrieve and/or access messages left by and/or for subscribers of an IMS network, the messaging server 160 of FIG. 4 includes one or more messaging agents (one of which is designated in FIG. 4 with reference numeral 415) and one or more outdial agents (one of which is designated in FIG. 4 with reference numeral 420). When notified by a feature server that call screening is to be performed for a particular communication session (e.g., by receiving the example SIP INVITE message of FIG. 6), the example messaging agent 415 of FIG. 4 interacts with the calling device via the example SIP interface 405 to establish a first communication session (e.g., by responding to the received SIP INVITE message). The first communication session will be used by the calling party to leave, provide and/or record a message for the called party. The example messaging agent 415 of FIG. 4 also directs and/or instructs the example outdial agent 420 to initiate a second communication session with the called device (e.g., one of the example IMS device 105 and 106). The example outdial agent 420 of FIG. 4 initiates the second communication session by, for example, sending the example SIP INVITE message of FIG. 7. As described more fully below in connection with FIG. 7, the second communication session is initiated by the example outdial agent 420 such that the second communication session cannot be forwarded (e.g., back to the messaging server 160) and such that the called device automatically answers and/or automatically establishes the second communication session. The example outdial agent 420 also initiates the second communication session such that the second communication session is handled and/or processed by the same media handler 425, 426 that is also processing and/or handling the first communication session.

To route data within the example messaging server 160 of FIG. 4, the messaging server 160 includes one or more media handlers, two of which are designated in FIG. 4 with reference numerals 425 and 426. The example media handlers 425 and 426 of FIG. 4 route data between the example messaging agent 415 and respective media interfaces 410 and 411. The example media handlers 425 and 426 also bridge media data between media data streams to facilitate call screening. The media handler 425, 426 facilitates call screening by providing media data received from the calling device via the first communication session to both the called device via the second communication session and to the example messaging agent 415 that is recording a message being left by the calling party. The media handler 425, 426 also routes media data sent by the messaging agent 415 for the calling device to the calling device via the first communication session. Likewise, the media handler 425, 426 routes data received from the called device via the second communication session to the messaging agent 415. In this way, the media handler 425, 426 performs "bridging" such that the called device can simultaneously a) review a message as it is being left, recorded and/or provided by the calling party, and b) interact with the messaging agent 415 to provide and/or make one or more message handling selections.

The example messaging agent 415 responds to message and/or call screening handling selections made and/or provided by the called device (e.g., by decoding DTMF signals received from the called device). For example, the user of the called device can indicate that the message is to be automatically deleted by the messaging agent 415 once the message is complete, the user of the called device can indicate that the message is to be forwarded once the message is complete, the user of the called device can request to be connected via a traditional messaging communication session to the messaging server 160 (e.g., to be connected to the example messaging agent 415), etc. Additionally or alternatively, the user of the called device can request to communicate directly with the calling party. In such an example, the example messaging agent 415 instructs the feature server 155, 156 (e.g., by sending the example SIP REFER message of FIG. 8 to the feature server 155, 156), which originally forwarding the calling party to the messaging server 160, to initiate a communication session between the calling and called devices such that the communication session does not involve and/or require any resources (e.g., signaling, media and/or otherwise) of the messaging server 160.

While an example manner of implementing the example messaging server 160 of FIG. 1 has been illustrated in FIG. 4, one or more of the interfaces, elements, agents, processes and/or devices illustrated in FIG. 4 may be combined, divided, re-arranged, omitted, eliminated and/or implemented in any other way. For example, the messaging server 160 may be implemented by modifying, updating and/or enhancing a traditional and/or existing messaging server by the addition of one or more functions of the example messaging agent 415, the example outdial agent 420 and/or the example media handlers 425 and 426. Further, the example SIP interface 405, the example media interfaces 410 and 411, the example messaging agent 415, the example outdial agent 420, the example media handlers 425 and 426 and/or, more generally, the example messaging server 160 may be implemented by hardware, software, firmware and/or any combination of hardware, software and/or firmware. Further still, the example messaging server may include interfaces, elements, agents, processes and/or devices instead of, or in addition to, those illustrated in FIG. 4 and/or may include more than one of any or all of the illustrated interfaces, elements, agents, processes and/or devices.

Figure 5:
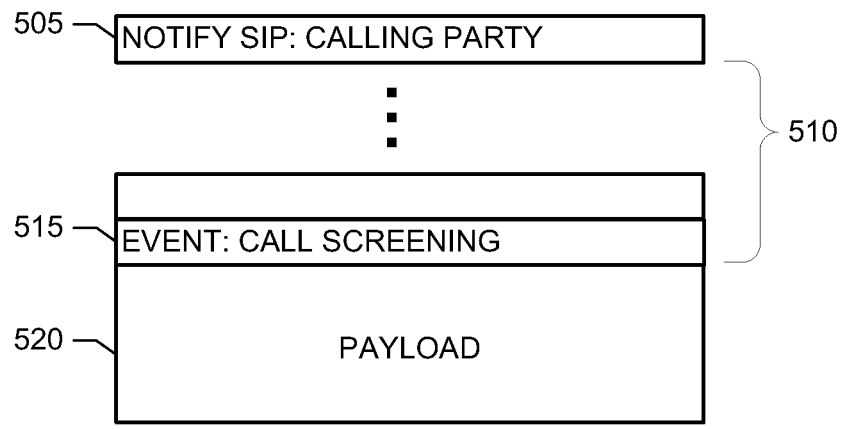
FIGS. 5, 6, 7 and 8 illustrate example messages that may be used to implement any or all of the example techniques described herein.

FIG. 5 illustrates an example data structure that may be used by an IMS device (e.g., any or all of the example IMS devices 105 and 106 of FIGS. 1, 2A and/or 2B) to provide a call screening notification for a given requested call. The example data structure of FIG. 5 is constructed in accordance with a VoIP protocol message, such as a SIP NOTIFY message. However, any type of data structure may be used to provide a call screening notification for a particular communication session.

To identify the SIP message, the example data structure of FIG. 5 includes a name field 505. The example name field 505 of FIG. 5 includes an alphanumeric string that identifies the SIP message and identifies a destination for the example message. The example SIP message illustrated in FIG. 5 is a SIP NOTIFY message and, thus, the example name field 505 contains a string that includes "NOTIFY SIP:". In the illustrated example data structure, the SIP message is addressed to the calling party that sent the original communication session initiation request to the IMS device. Persons of ordinary skill in the art will readily recognize that the name field 505 could be used to identify other types of SIP messages and/or other destinations.

To provide additional values and/or parameters, the example data structure of FIG. 5 includes one or more header fields 510. Example header fields 510 include, but are not limited to, a from field, a caller identification field, a command sequence number field, and/or payload length field. The number of header fields 510, in some examples, depends upon the type of SIP message and/or the protocol(s) implemented by either endpoint.

To identify that the data structure of FIG. 5 as indicating that call screening for a particular communication session is to be performed, the example header 510 of FIG. 5 includes an event field 515. The example event field 515 of FIG. 5 contains a string that includes "CALL SCREENING" to indicate that call screening for the particular communication session is to be performed. To convey and/or carry any number and/or type(s) of additional data and/or information, the example data structure of FIG. 5 may include a payload 520.

FIG. 6 illustrates an example data structure that may be used by a feature server (e.g., any or all of the example feature servers 155 and 156 of FIGS. 1 and/or 3) to initiate a call screening session for a particular communication session. The example data structure of FIG. 6 may be sent to a messaging platform (e.g., any or all of the example messaging server 160 of FIGS. 1 and/or 4) in response to a call screening request received from an IMS device (e.g., any or all of the example IMS devices of FIGS. 1, 2A and/or 2B). The example data structure of FIG. 6 is constructed in accordance with a VoIP protocol message, such as a SIP INVITE message. However, any type of data structure may be used to provide a call screening notification for a particular communication session.

To identify the SIP message, the example data structure of FIG. 6 includes a name field 605. The example name field 605 of FIG. 6 includes an alphanumeric string that identifies the SIP message and identifies a destination for the example message. The example SIP message illustrated in FIG. 6 is a SIP INVITE message and, thus, the example name field 605 contains a string that includes "INVITE SIP:". In the illustrated example data structure, the SIP message is addressed to the re-directing destination (e.g., voicemail box number) associated with the called party. Persons of ordinary skill in the art will readily recognize that the name field 605 could be used to identify other types of SIP messages and/or other destinations.

To provide additional values and/or parameters, the example data structure of FIG. 6 includes one or more header fields 610. Example header fields 610 include, but are not limited to, a from field, a caller identification field, a command sequence number field, and/or payload length field. The number of header fields 610, in some examples, depends upon the type of SIP message and/or the protocol(s) implemented by either endpoint. To convey and/or carry any number and/or type(s) of additional data and/or information, the example data structure of FIG. 6 may include a payload 615.

To indicate that the data structure of FIG. 6 is to indicate that call screening for a particular communication session is to be performed, the example data structure of FIG. 6 includes a diversion header 620. Diversion headers 620 are commonly used to, for example, route an unanswered communication session to a messaging server. The example diversion header 620 of FIG. 6 contains one or more fields. The example diversion header 620 contains a diversion field 625 that contains a string that includes "DIVERSION:" to indicate that the data structure has been diverted from an original destination. To indicate that call screening is to be performed, the example diversion header 620 of FIG. 6 includes a reason field 630. The example reason field 630 of FIG. 6 contains a new reason code that is specified by a string that includes "CALL FORWARD SCREENING." The example reason code 630 of FIG. 6 indicates that the messaging server is to perform the example call screening techniques described herein.

FIG. 7 illustrates an example data structure that may be used by a messaging server (e.g., by the example outdial agent 420 of FIG. 4) to initiate a call screening communication session to a called IMS device (e.g., any or all of the example IMS devices 105 and 106 of FIGS. 1, 2A and/or 2B). The example data structure of FIG. 7 is constructed in accordance with a VoIP protocol message, such as a SIP INVITE message. However, any type of data structure may be used to provide a call screening notification for a particular communication session.

To identify the SIP message, the example data structure of FIG. 7 includes a name field 705. The example name field 705 of FIG. 7 includes an alphanumeric string that identifies the SIP message and identifies a destination for the example message. The example SIP message illustrated in FIG. 7 is a SIP INVITE message and, thus, the example name field 705 contains a string that includes "INVITE SIP:". In the illustrated example data structure, the SIP message is addressed to the called party that requested the call screening communication session. Persons of ordinary skill in the art will readily recognize that the name field 705 could be used to identify other types of SIP messages and/or other destinations.

To provide additional values and/or parameters, the example data structure of FIG. 7 includes one or more header fields 710. Example header fields 710 include, but are not limited to, a from field 715, a caller identification field, a command sequence number field, and/or payload length field. The number of header fields 710, in some examples, depends upon the type of SIP message and/or the protocol(s) implemented by either endpoint. To convey and/or carry any number and/or type(s) of additional data and/or information, the example data structure of FIG. 7 may include a payload 720.

To indicate how the called IMS device is to process and/or handle the requested call screening communication session invitation of FIG. 7, the example header fields 710 of FIG. 7 include one or more of an auto-answer field 725, a no-call-forward field 730 and/or a ring-identifier field 730. The example auto-answer field 725 of FIG. 7 contains a string that includes "AUTO ANSWER" to indicate to the called IMS device that the communication session is to be accepted and/or established by the called IMS device automatically and/or without any intervention by the user of the called IMS device. The example no-call-forward field 730 of FIG. 7 contains a string that includes "NO FORK" to indicate that any devices and/or servers of the IMS network are not to re-direct and/or forward the communication session. The example ring-identifier field 735 of FIG. 7 contains one or more values and/or identifiers that represent a particular type of ring (e.g., a ring tone) to be provided by the called IMS device for the user of the called IMS device while the call screening communication session is being established.

Figure 8:
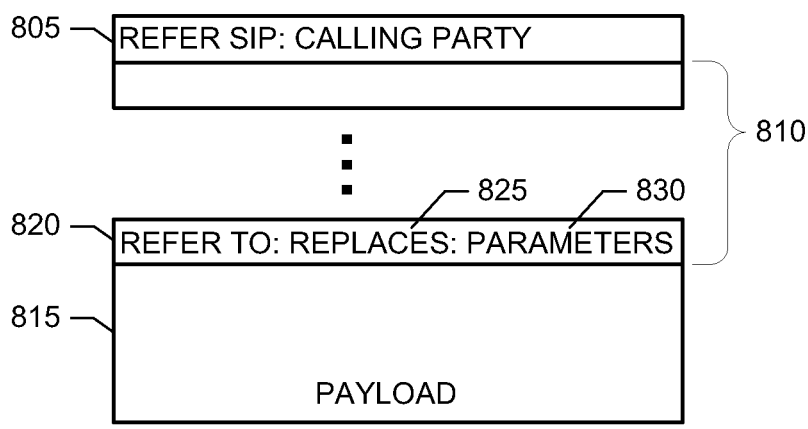

FIG. 8 illustrates an example data structure that may be used by a messaging server (e.g., by the example messaging agent 415 of FIG. 4) to terminate a call screening communication session. The example data structure of FIG. 8 is constructed in accordance with a VoIP protocol message, such as a SIP REFER message. However, any type of data structure may be used to provide a call screening notification for a particular communication session.

To identify the SIP message, the example data structure of FIG. 8 includes a name field 805. The example name field 805 of FIG. 8 includes an alphanumeric string that identifies the SIP message and identifies a destination for the example message. The example SIP message illustrated in FIG. 8 is a SIP REFER message and, thus, the example name field 805 contains a string that includes "REFER SIP:". In the illustrated example data structure, the SIP message is addressed to the calling party that sent the original communication session initiation request to the IMS device and, thus, will be processed and/or handled by the feature server that requested and/or initiated the call screening communication session. Persons of ordinary skill in the art will readily recognize that the name field 805 could be used to identify other types of SIP messages and/or other destinations.

To provide additional values and/or parameters, the example data structure of FIG. 8 includes one or more header fields 810. Example header fields 810 include, but are not limited to, a from field, a caller identification field, a command sequence number field, and/or payload length field. The number of header fields 810, in some examples, depends upon the type of SIP message and/or the protocol(s) implemented by either endpoint. To convey and/or carry any number and/or type(s) of additional data and/or information, the example data structure of FIG. 8 may include a payload 815.

To facilitate the initiation of a communication session between the calling and called devices that does not require any resources (e.g., media, signaling and/or otherwise) of the messaging server, the example header fields 810 of FIG. 8 include a refer-to field 820. The example refer-to field 820 of FIG. 8 contains an embedded string 825 that contains "REPLACES" to indicate that the current media streams going to and from the messaging server are to be replaced by the a new media stream between the called and calling parties. To facilitate the establishment of the communication session directly between the calling and called devices, the example refer-to field 820 of FIG. 8 contains one or more parameters 830 of the previous communication session between the messaging server and the called device.

The feature server processes the example data structure of FIG. 8 to a) send a SIP BYE message on the first communication session between the calling party and the messaging server to thereby end the first communication session, b) send a SIP BYE message on the second communication session between the called party and the messaging server to thereby end the second communication session, and c) send a SIP RE-INVITE message (based on the parameters 830) to both the called device and the calling device to establish a new communication session between the called and calling devices. While SIP REFER messages are presently used in the industry, the inter-working of a SIP REFER message described herein to terminate the first and second communication sessions and to establish a third communication session (between the calling and called devices) is not performed by traditional IMS networks. However, by doing so, the example feature servers 155 and 156 of FIG. 1 release all resources (e.g., media, signaling and/or otherwise) of the messaging server.

While example data structures are illustrated in FIGS. 5-8, the example data structures may be implemented using any number and/or type(s) of other and/or additional fields and/or data. Further, the fields and/or data illustrated in FIGS. 5-8 may be combined, divided, re-arranged, eliminated and/or implemented in any desired manner. Moreover, the example data structures may include fields and/or data in addition to, or instead of, those illustrated in FIGS. 5-8, and/or may include more than one of any or all of the illustrated fields and/or data.

FIGS. 9, 10A, 10B and 10C illustrate example protocol message exchanges, and/or flowcharts representative of example machine accessible instructions that may be executed to implement the example IMS devices 105 and 106, the example feature servers 155 and 156, the example messaging servers 160 and/or, more generally, the example IMS network 115 of FIGS. 1, 2A-B, 3 and/or 4. For ease of illustration in examples of FIGS. 9 and 10A-C, all P-CSCF servers, S-CSCF servers and I-CSCF servers involved in a particular protocol message exchange are designated in FIGS. 9 and 10A-C with a single reference numeral 905. Within the example P/S-I-CSCF 905 of FIGS. 9 and 10A-C, protocol messages are handled, processed and/or routed as performed in traditional IMS networks. The example exchanges and/or the example machine accessible instructions of FIGS. 9 and/or 10A-C may be carried out one or more processor(s), controller(s) and/or any other suitable processing device(s). For example, the example exchanges and/or the example machine accessible instructions of FIGS. 9 and/or 10A-C may be embodied in coded instructions stored on a tangible medium such as a flash memory, a ROM and/or RAM associated with a processor (e.g., the example processor 1405 discussed below in connection with FIG. 14). Alternatively, some or all of the example exchanges and/or the example machine accessible instructions of FIGS. 9 and/or 10A-C may be implemented using any combination(s) of application specific integrated circuit(s) (ASIC(s)), programmable logic device(s) (PLD(s)), field programmable logic device(s) (FPLD(s)), discrete logic, hardware, firmware, software, etc. Also, some or all of the example exchanges and/or the example machine accessible instructions of FIGS. 9 and/or 10A-C may be implemented manually or as any combination(s) of any of the foregoing techniques, for example, as any combination of firmware, software, discrete logic and/or hardware. Persons of ordinary skill in the art will readily appreciate that many other methods of implementing the example IMS devices 105 and 106, the example feature servers 155 and 156, the example messaging servers 160 and/or, more generally, the example IMS network 115 of FIGS. 1, 2A-B, 3 and/or 4 may be employed. For example, the order of execution of the blocks of the example flowcharts and/or the example exchanges of FIGS. 9 and/or 10A-C may be changed, and/or some of the blocks and/or exchanges described may be changed, eliminated, sub-divided, and/or combined. Additionally, persons of ordinary skill in the art will appreciate that any or all of the example exchanges and/or the example machine accessible instructions of FIGS. 9 and/or 10A-C may be carried out sequentially and/or carried out in parallel by, for example, separate processing threads, processors, devices, discrete logic, circuits, etc.

Figure 9:
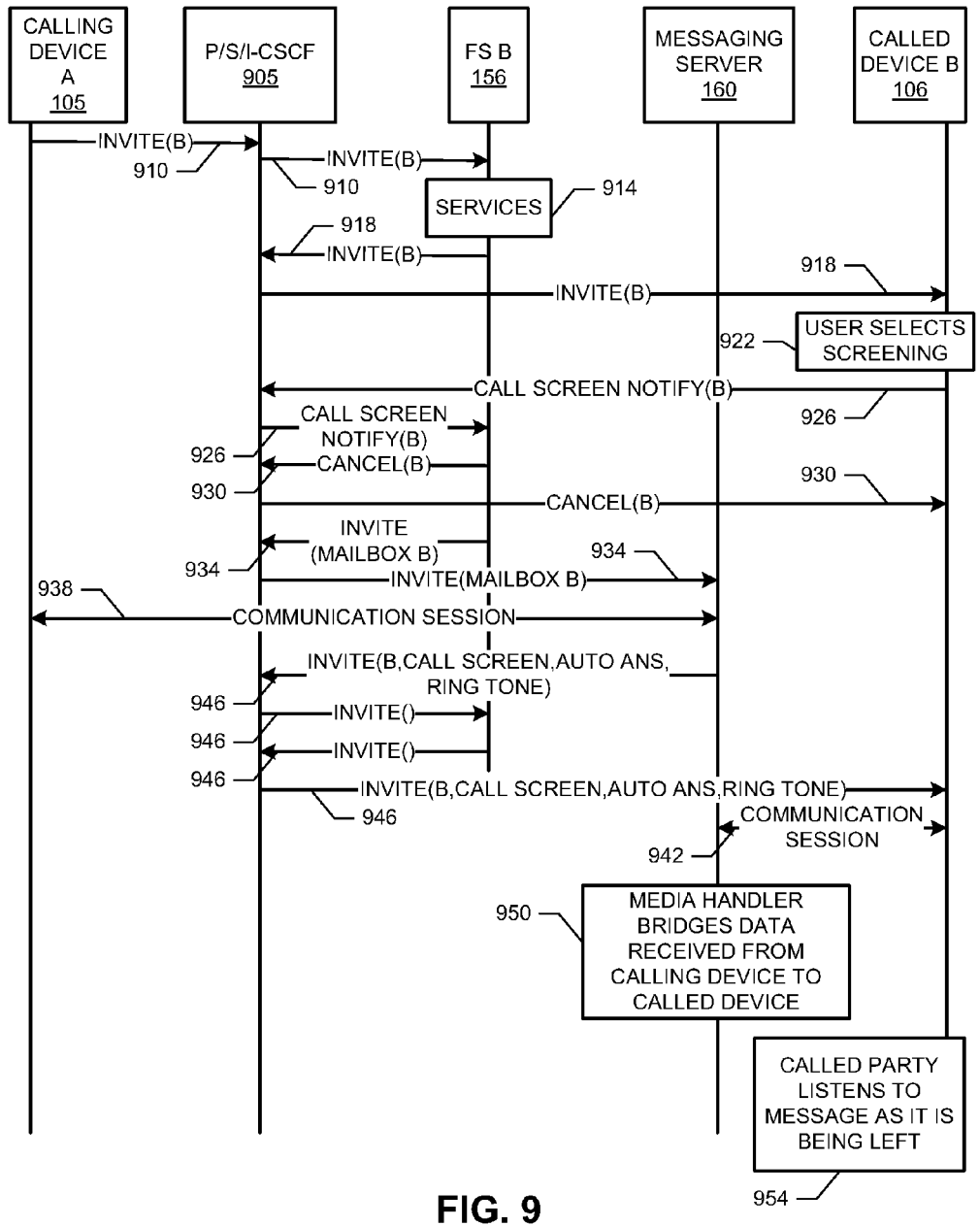
FIGS. 9, 10A, 10B and 10C illustrates example protocol message exchanges and flowcharts representative of machine accessible instructions that may be executed to implement any or all of the example IMS devices, the example feature servers, the example messaging servers and/or, more generally, the example IMS network of FIGS. 1-4.

The example protocol message exchanges of FIG. 9 begin with the example calling IMS device A 105 sending a communication session initiation message 910 (e.g., a SIP INVITE message), which specifies called IMS device B 106 as the destination for the communication session, to the P/S/I-CSCF 905. The P/S/I-CSCF 905 forwards the initiation message 910 to the feature server (FS) B 156 for the called IMS device B 105, which performs, carries out and/or implements destination call features (if any) for the IMS device A 105 (block 918).

When the feature server B 156 completes any destination call features (block 918), the feature server B 156 sends a SIP INVITE message 918 to the called device B 106 via the P/S/I-CSCF 905. In the illustrated example of FIG. 9, a user of the called device B 106 indicates that call screening is to be performed for the requested communication session (e.g., by pressing the example soft key 250 of FIG. 2A) (block 922). In response to the call screening selection by the user (block 922), the called device B 106 sends a call screening notification message 926 (e.g., the example SIP NOTIFY message of FIG. 5) to the feature server B 156 via the P/S/I-CSCF 905.

In response to the call screening notification message 926, the feature server B 156 sends a SIP CANCEL message 930 to the called device B 106 via the P/S/I-CSCF 905. The feature server B 156 then sends a call screening initiation message 934 (e.g., the example SIP INVITE message of FIG. 6) to the messaging server 160 via the P/S/I-CSCF 905.

Based on the call screening initiation message 934, the messaging server 160 establishes a first communication session 938 with the calling device A 105. The messaging server also initiates a second communication session 942 with the called device B 106 by sending a call screening communication session initiation message 946 (e.g., the example SIP INVITE message of FIG. 7) to the called device B 106 via the P/S/I-CSCF 905 and the feature server B 156.

Once the first and second communication sessions 938 and 942 are established, the messaging server (e.g., one of the example media handlers 425, 426 of FIG. 4) bridges data between the first and second communication sessions 938 and 942 (block 950) such that the user of the called device B 106 can listen to a message as it is being left, recorded and/or provided by a user of the calling device A 105 (block 954).

Figure 10A:
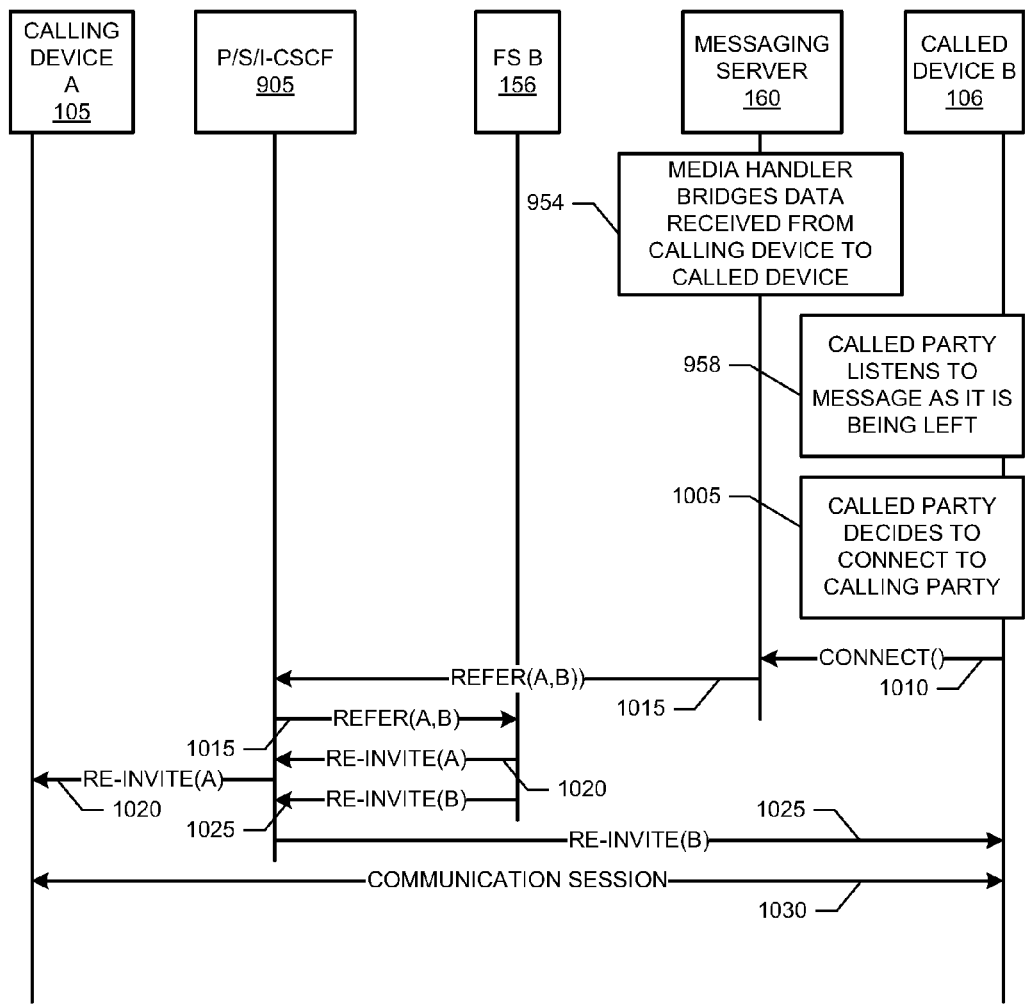
Figure 10B:
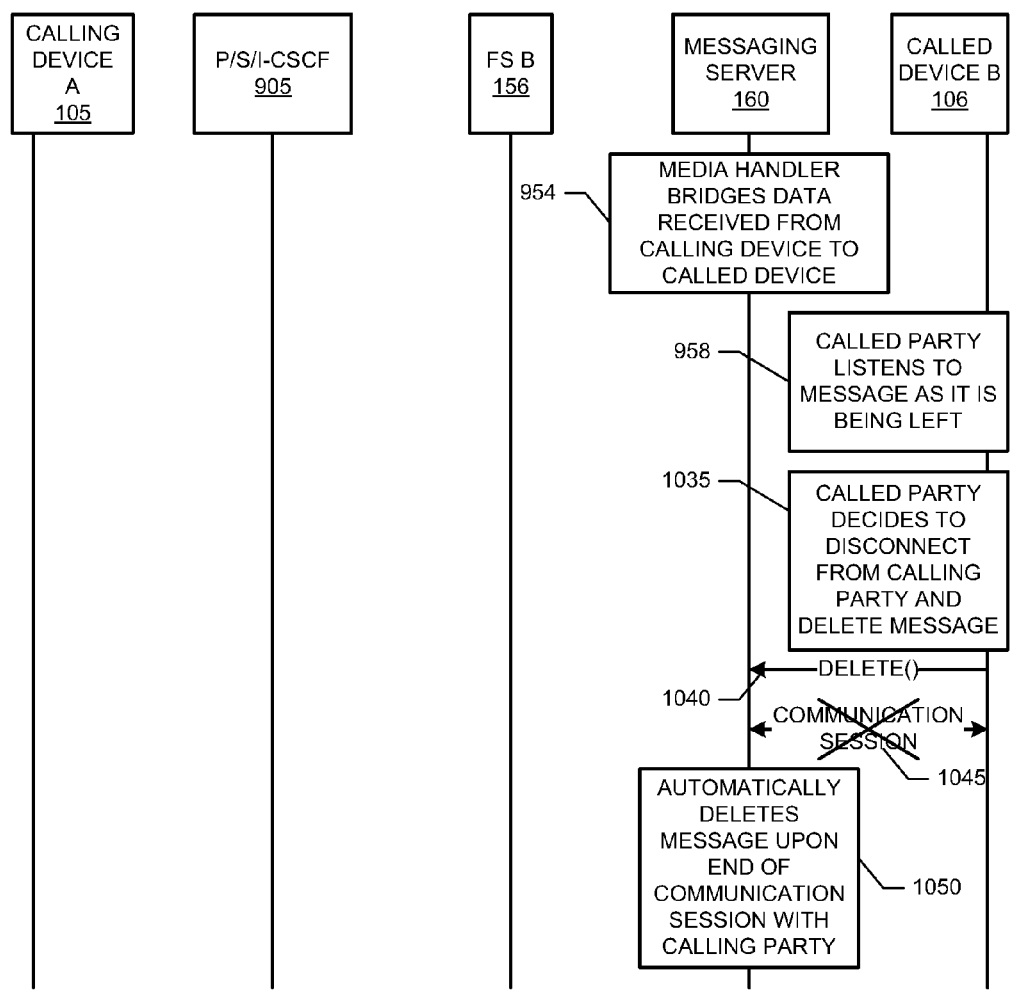
Figure 10C:
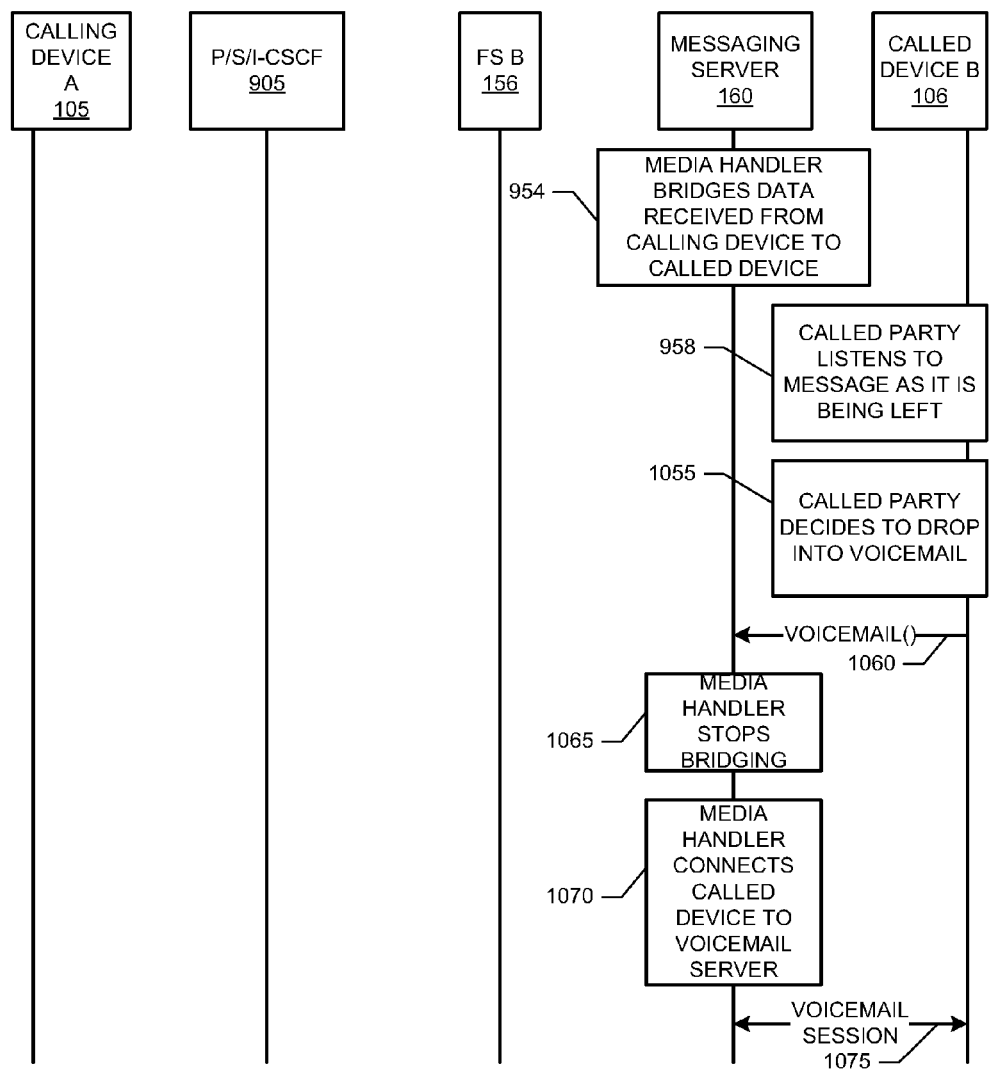

The example protocol message exchanges, and flowcharts representative of machine accessible instructions of FIGS. 10A-C may be executed after a call screening communication session has been established by, for example, the example protocol message exchange and/or machine accessible instructions of FIG. 9. In the illustrated example of FIG. 10A, while listening to a message being left, recorded and/or provided by a user of the calling device A 105 (block 958), the user of the called device B 106 decides they wish to communicate directly with the user of the calling device A 105 (block 1005). For example, the user of the called device B 106 presses the example soft key 250 of FIG. 2B. By indicating that they desire to communicate directly with the user of the calling device A 105, the user of the called device B 106 causes the called device B 106 to send a connect request message 1010 to the messaging server 160. The connect request message 1010 may be, for example, a DTMF signal, and/or a control and/or protocol message.

In response to the connect request message 1010, the messaging server 160 sends a SIP REFER message 1015 (e.g., the example SIP REFER message of FIG. 8) to the feature server B 156 via the P/S/I-CSCF 905. The feature server B 156 sends a first SIP RE-INVITE message 1020 to the calling device A 105 via the P/S/I-CSCF 905, and then sends a second SIP RE-INVITE message 1025 to the called device B 106 via the P/S/I-CSCF 905. Based on the SIP RE-INVITE messages 1020 and 1025, the calling device A 105 and the called device B 106 establish a direct communication session 1030 that does not involve any resources (signaling, media and/or otherwise) of the messaging server 160.

In the illustrated example of FIG. 10B, while listening to a message being left, recorded and/or provided by a user of the calling device A 105 (block 958), the user of the called device B 106 decides they want to have the message deleted when the message is complete (block 1035). For example, the user of the called device B 106 presses the example soft key 245 or the example key pad button 265 of FIG. 2B. By indicating that they desire to end the call screening communication session and automatically have the message deleted, the user of the called device B 106 causes the called device B 106 to send a delete request message 1040 to the messaging server 160. The delete request message 1040 may be, for example, a DTMF signal, and/or a control and/or protocol message.

In response to the delete request message 1040, the example messaging server 160 terminates the communication session between the messaging server 160 and the called device B 106 (as designated with reference numeral 1045) without providing any indication to the calling party that the call screening has occurred. When the user of the calling device A 105 finishes leaving, recording and/or providing their message, the messaging server 160 automatically deletes the message (block 1050).

In the illustrated example of FIG. 10C, while listening to a message being left, recorded and/or provided by a user of the calling device A 105 (block 958), the user of the called device B 106 decides they want to establish a traditional messaging session (block 1055). For example, the user of the called device B 106 presses the example soft key 255 of FIG. 2B. By indicating they desire to establish a traditional messaging session, the user of the called device B 106 causes the called device B 106 to send a messaging request message 1060 to the messaging server 160. The messaging request message 1060 may be, for example, a DTMF signal, and/or a control and/or protocol message.

In response to the messaging request message 1060, the messaging server 160 (e.g., one of the example media handlers 425, 426 of FIG. 4) stops bridging the message being left by a user of the calling device A 105 onto the communication session between the messaging server 160 and the called device B 106 (block 1065) and routes data between the called device B 106 and a message agent (e.g., the example messaging agent 415) (block 1070) to enable a traditional messaging communication session 1075 during and/or after the time in which the calling party leaves, records and/or otherwise provides the message.

Figure 11:
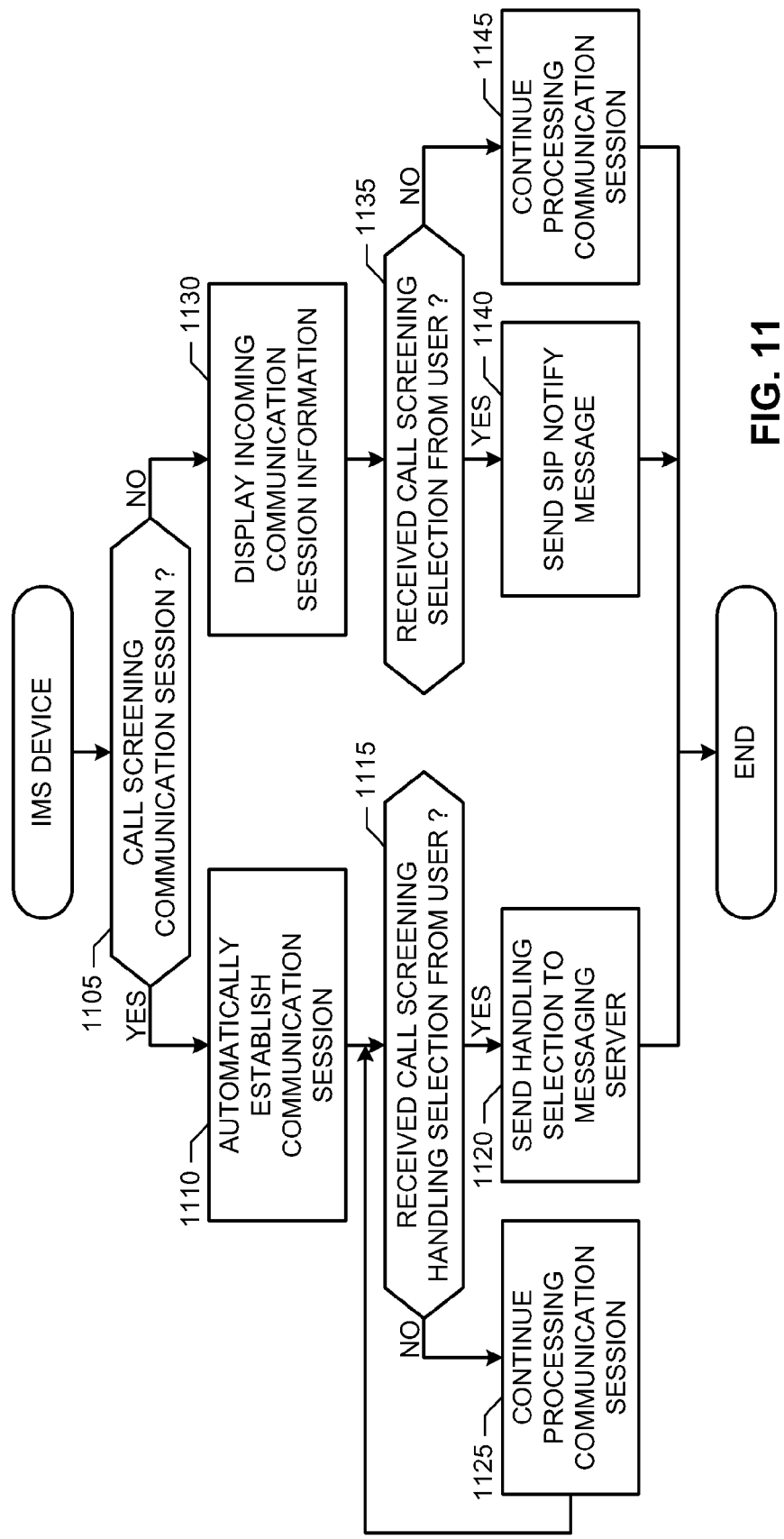
FIG. 11 is a flowchart representative of example machine accessible instructions that may be executed to implement any or all of the example IMS devices of FIGS. 1 and/or 2A-B.
Figure 12:
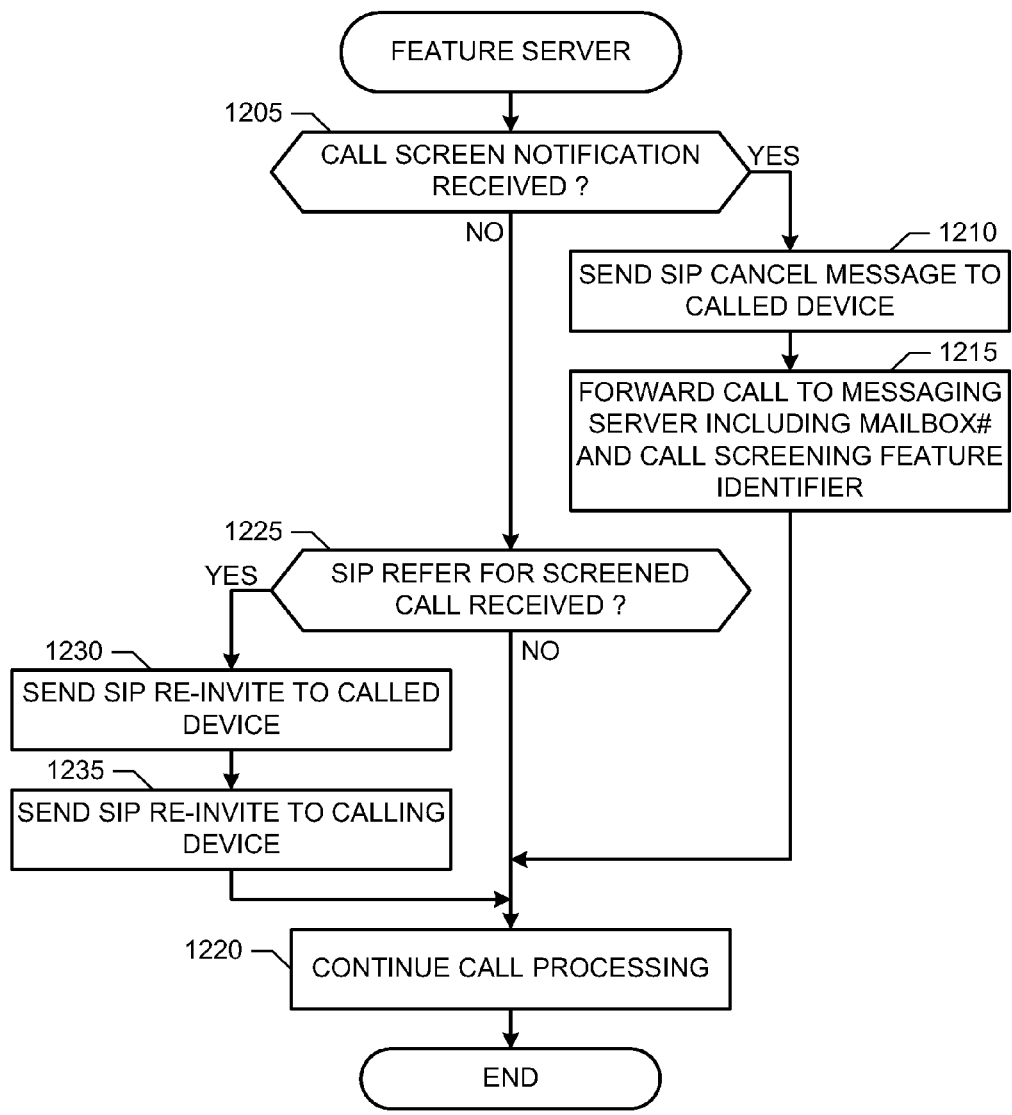
FIG. 12 is a flowchart representative of example machine accessible instructions that may be executed to implement any or all of the example feature servers of FIGS. 1 and/or 3.
Figure 13:
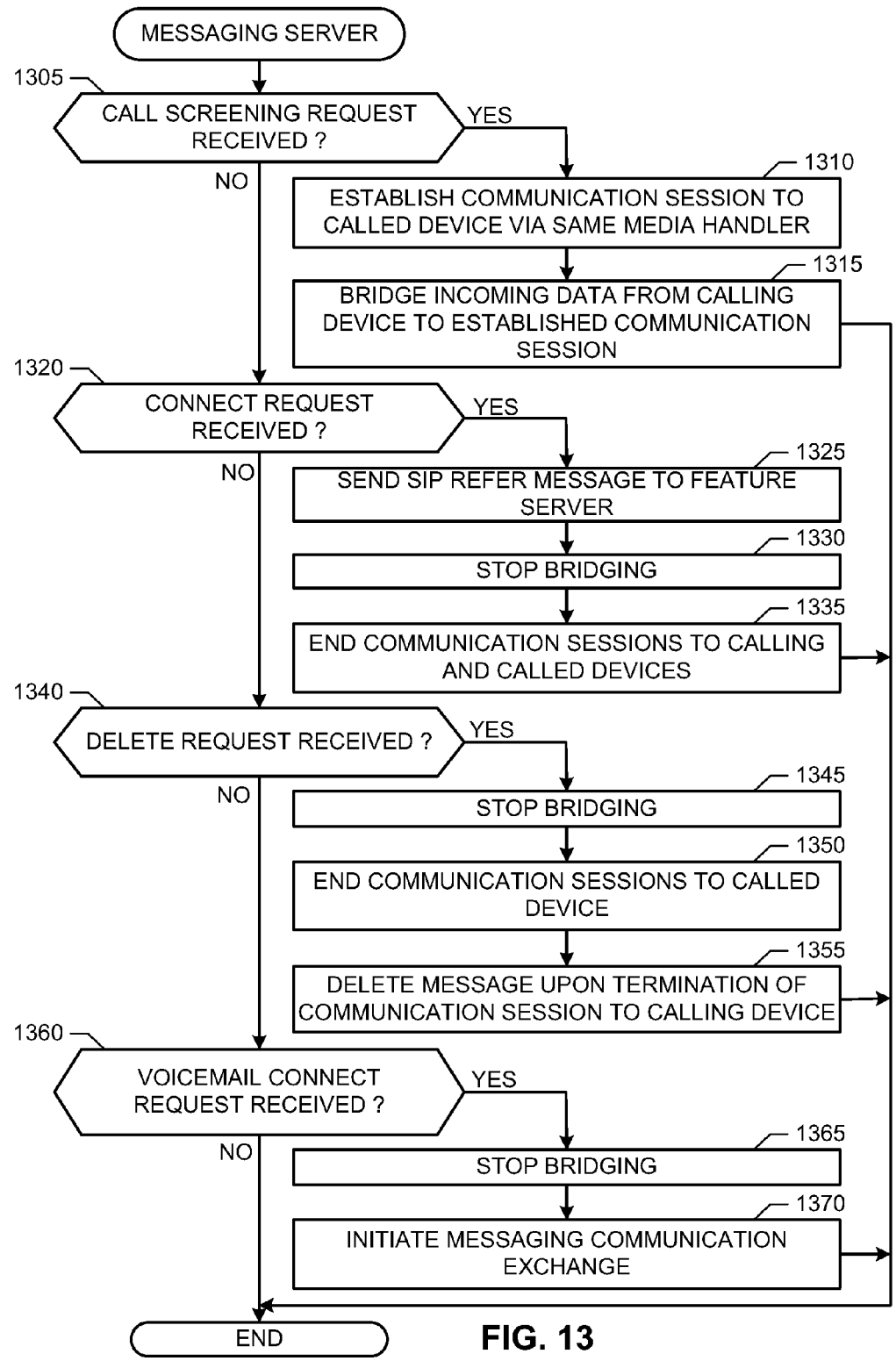
FIG. 13 is a flowchart representative of example machine accessible instructions that may be executed to implement any or all of the example messaging servers of FIGS. 1 and/or 4.

FIG. 11 illustrates example machine accessible instructions that may be executed to implement any or all of the example IMS devices 105 and 106 of FIGS. 1, 2A and/or 2B. FIG. 12 illustrates example machine accessible instructions that may be executed to implement any or all of the example feature servers 155 and 156 of FIGS. 1 and/or 3. FIG. 13 illustrates example machine accessible instructions that may be executed to implement any or all of the example messaging servers 160 of FIGS. 1 and/or 4. The example machine accessible instructions of FIGS. 11, 12 and/or 13 may be carried out by a processor, a controller and/or any other suitable processing device. For example, the example machine accessible instructions of FIGS. 11, 12 and/or 13 may be embodied in coded instructions stored on a tangible medium such as a flash memory, a ROM and/or RAM associated with a processor (e.g., the example processor 1405 discussed below in connection with FIG. 14). Alternatively, some or all of the example machine accessible instructions of FIGS. 11, 12 and/or 13 may be implemented using any combination(s) of ASIC(s), PLD(s), FPLD(s), discrete logic, hardware, firmware, etc. Also, some or all of the example machine accessible instructions of FIGS. 11, 12 and/or 13 may be implemented manually or as any combination of any of the foregoing techniques, for example, any combination of firmware, software, discrete logic and/or hardware. Further, although the example machine accessible instructions are described with reference to the flowcharts of FIGS. 11, 12 and 13, persons of ordinary skill in the art will readily appreciate that many other methods of implementing the machine accessible instructions of FIGS. 11, 12 and 13 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIGS. 11, 12 and/or 13 may be carried out sequentially and/or carried out in parallel by, for example, separate processing threads, processors, devices, discrete logic, circuits, etc.

The example machine accessible instructions of FIG. 11 begin at a time after call screening has been selected by a called device and/or when the called IMS device (e.g., any of the example IMS devices 105 and 106 of FIGS. 1, 2A and/or 2B) receives a communication initiation request message (e.g., a SIP INVITE message) (e.g., via the example network interface 225 of FIGS. 2A and/or 2B). Because the communication initiation request message (e.g., the example SIP INVITE message of FIG. 6) is received from a messaging server and is to initiate a call screening communication session (block 1105), the IMS device (e.g., the example controller 230) automatically accepts and/or establishes the call screening communication session (block 1110). Had the call screening mode not been pre-selected, control would have passed from block 1105 to block 1150 as discussed below.

Returning to the case when call screening is activated and a session is automatically established (block 1110), a call screening handling selection is received at the IMS device (e.g., a user of the IMS device presses one of the example soft keys 245, 250 or 255 of FIG. 2B) (block 1115), the IMS device sends the call screening handling selection to the messaging platform (block 1120). For example, the controller sends a control and/or protocol packet and/or message to the messaging server, and/or the IMS devices sends a DTMF signal within the media stream for the call screening communication session. Control then exits from the example machine accessible instructions of FIG. 11.

Until either the call screening communication session is ended or until a call screening handling selection is received, the IMS device continues traditional processing of the call screening communication session (block 1125).

Returning to block 1105, if the communication initiation request message is not for a call screening communication session (block 1105), the controller displays (e.g., on the example display 205 of FIG. 2A) information regarding the communication session (block 1130). When a call screening selection for the incoming communication session is received from a user of the IMS device (e.g., the user pressing the example soft key 250 of FIG. 2A) (block 1135), the controller sends a SIP NOTIFY message (e.g., the example SIP NOTIFY message of FIG. 5) to the messaging platform (block 1140). Control then exits from the example machine accessible instructions of FIG. 11.

If a call screening selection is not received for the incoming communication session (block 1135), the controller continues traditional processing of the incoming communication session (block 1145) to thereby establish a communication session between the calling party and the called party or between the calling party and the messaging server. Control then exits from the example machine accessible instructions of FIG. 11.

The example machine accessible instructions of FIG. 12 begin when a feature server (e.g., any of the example feature servers 155 and 156 of FIGS. 1 and/or 3) receives a message related to a new and/or ongoing call screening communication session. When a notification (e.g., the example SIP NOTIFY message of FIG. 5) that a new communication session is to be screened is received from a called IMS device (e.g., via the example SIP interface 305 of FIG. 3) (block 1205), the feature server (e.g., the example call screening agent 310) sends a SIP CANCEL message to the called device (block 1210). The call screening agent then forwards the communication session to a messaging server (e.g., by sending the example SIP INVITE message of FIG. 6) (block 1215). The call screening agent continues call processing for the communication session (block 1220). Control then exits from the example machine accessible instructions of FIG. 12.

If a new communication session is not to be screening (block 1205) and when a notification (e.g., the example SIP REFER message of FIG. 8) to terminate a call screening communication session and to communicatively couple the called and calling devices is received (block 1225), the call screening agent sends a SIP RE-INVITE message to the called device (block 1230) and sends a SIP RE-INVITE message to the calling device (block 1235). The call screening agent then continues call processing for the communication session (block 1220). Control then exits from the example machine accessible instructions of FIG. 12.

The machine accessible instructions of FIG. 13 begin with a messaging server (e.g., any of the example messaging servers 160 of FIGS. 1 and/or 4) determining if a call screening request message (e.g., the example SIP INVITE message of FIG. 6) was received (block 1305). If a call screening request message was received (block 1305), the messaging server (e.g., the example outdial agent 420 of FIG. 4) establishes a communication session to the called device via the same media handler (e.g., any of the example media handlers 425 and 426) that is processing the communication session between the messaging server and the calling device (block 1310). The media handler begins bridging data between the two communication sessions to enable substantially real-time screening of the message being left by a user of the calling device (block 1315). Control then exits from the example machine accessible instructions of FIG. 13.

If a connect request (e.g., the example connect message 1010 of FIG. 10A) is received (block 1320), the messaging server (e.g., the example messaging agent 415 of FIG. 4) sends a SIP REFER message (e.g., the example SIP REFER message of FIG. 8) to the feature server (block 1325). The messaging agent instructs and/or directs the media handler to stop performing bridging (block 1330) and terminates the communication sessions to the calling and called devices (block 1335). Control then exits from the example machine accessible instructions of FIG. 13.

If a message delete request (e.g., the example delete message 1040 of FIG. 10B) is received (block 1340), the messaging agent instructs and/or directs the media handler to stop performing bridging (block 1345), and terminates the communication session with the called device (block 1350) while maintaining the communication session with the calling device. Upon termination of the communication session with the calling device, the messaging agent automatically deletes the message left, provided and/or recorded by a user of the calling device (block 1355). Control then exits from the example machine accessible instructions of FIG. 13.

If a messaging session request (e.g., the example messaging request message 1060 of FIG. 10B) is received (block 1360), the messaging agent instructs and/or directs the media handler to stop performing bridging (block 1365). The messaging agent then initiates a traditional messaging communication exchange via the communication session already established between the called party and the messaging agent (block 1370). Control then exits from the example machine accessible instructions of FIG. 13.

Figure 14:
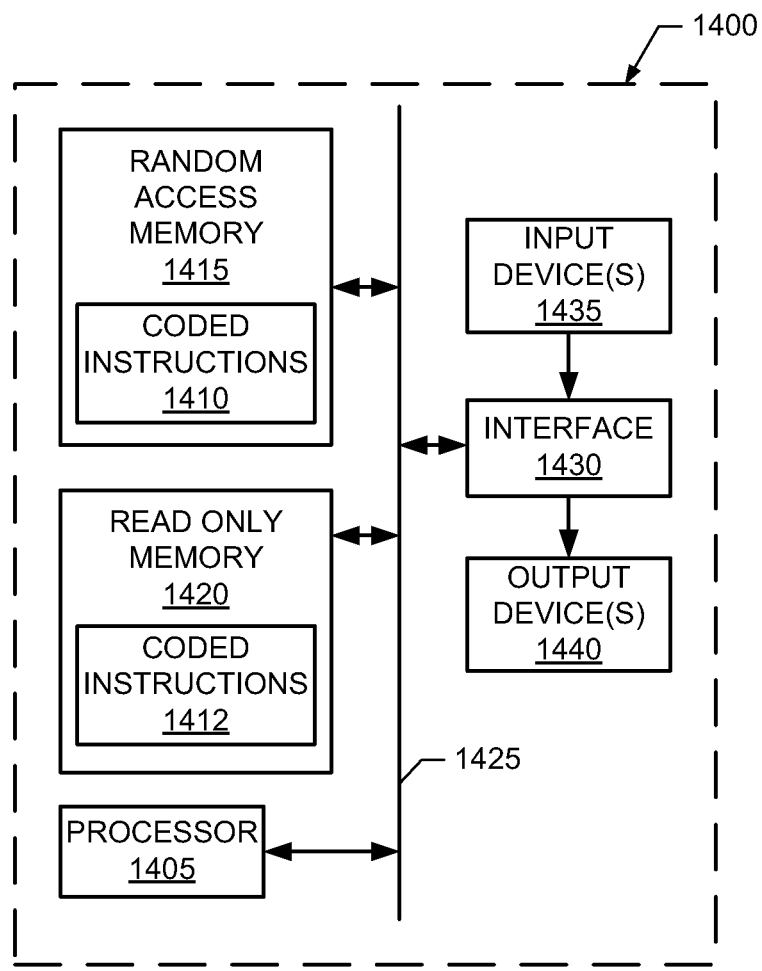
FIG. 14 is a schematic illustration of an example processor platform that may be used and/or programmed to carry out the example message exchanges and/or the example machine accessible instructions of FIGS. 9, 10A-C and/or 11-13 to implement any of all of the example methods and apparatus described herein.

FIG. 14 is a schematic diagram of an example processor platform 1400 that may be used and/or programmed to implement all or a portion of any or all of the example IMS device 105 and 106, the example feature servers 155 and 156, the example messaging server 160 and/or, more generally, the example IMS network 115 of FIGS. 1-4. For example, the processor platform 1400 can be implemented by one or more general purpose processors, processor cores, microcontrollers, etc.

The processor platform 1400 of the example of FIG. 14 includes at least one general purpose programmable processor 1405. The processor 1405 executes coded instructions 1410 and/or 1412 present in main memory of the processor 1405 (e.g., within a RAM 1415 and/or a ROM 1420). The processor 1405 may be any type of processing unit, such as a processor core, a processor and/or a microcontroller. The processor 1405 may execute, among other things, the example exchanges and/or the example machine accessible instructions of FIGS. 9, 10A-C and/or 11-13 to implement the example methods and apparatus described herein.

The processor 1405 is in communication with the main memory (including a ROM 1420 and/or the RAM 1415) via a bus 1425. The RAM 1415 may be implemented by DRAM, SDRAM, and/or any other type of RAM device, and ROM may be implemented by flash memory and/or any other desired type of memory device. Access to the memory 1415 and 1420 may be controlled by a memory controller (not shown).

The processor platform 1400 also includes an interface circuit 1430. The interface circuit 1430 may be implemented by any type of interface standard, such as an external memory interface, serial port, general purpose input/output, etc. One or more input devices 1435 and one or more output devices 1440 are connected to the interface circuit 1430. The input devices 1435 and/or output devices 1440 may be used to, for example, implement the example network interfaces 225 of FIGS. 2A and 2B, the example SIP interface 305 of FIG. 3, and/or the example SIP interface 405 and/or the example media interfaces 410 and 411 of FIG. 4.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    receiving, at a feature server of an Internet protocol multimedia subsystem, a call screening indication message originated by a first user device to initiate a call screening session, the call screening indication message originated by the first user device while a call originated by a second user device is being established with the first user device, the first and second user devices being operable with the Internet protocol multimedia subsystem;
    sending, to the first user device, a communication session initiation message comprising a session initiation protocol INVITE message indicating session redirection and forwarding are prohibited, the communication session initiation message to establish the call screening session with the first user device;
    receiving a call screening termination message at the feature server;
    initiating a communication session between the first user device and the second user device in response to the call screening termination message, the first and second user devices having been involved in the call screening session; and
    releasing a signaling resource of a messaging server, the signaling resource having been used in the call screening session.

2. The method as defined in claim 1, further comprising:
    sending a first session initiation protocol RE-INVITE message to the first user device in response to the call screening termination message; and
    sending a second session initiation protocol RE-INVITE message to the second user device in response to the call screening termination message.

3. The method as defined in claim 2, wherein the call screening termination message is a session initiation protocol REFER message.

4. The method as defined in claim 1, further comprising:
    sending a call screening initiation message to the messaging server in response to the call screening indication message to initiate the call screening session, the call screening termination message to cause the call screening session initiated by the call screening initiation message to be terminated.

5. The method as defined in claim 1, wherein initiation of the communication session releases a media resource of the messaging server.

6. A tangible machine readable storage device comprising machine readable instructions which, when executed, cause a machine to perform operations comprising:
    initiating a call screening session in response to a call screening indication message being received at a feature server of an Internet protocol multimedia subsystem, the call screening indication message originated by the first user device while a call originated by a second user device is being established with the first user device, the first and second user devices being operable with the Internet protocol multimedia subsystem;
    sending, to the first user device, a communication session initiation message comprising a session initiation protocol INVITE message indicating session redirection and forwarding are prohibited, the communication session initiation message to establish the call screening session with the first user device;
    initiating a communication session between the first user device and the second user device in response to a call screening termination message received at the feature server, the first and second user devices having been involved in the call screening session; and
    releasing a signaling resource of a messaging server, the signaling resource having been used in the call screening session.

7. The storage device as defined in claim 6, wherein the operations further comprise:
    sending a first session initiation protocol RE-INVITE message to the first user device in response to the call screening termination message; and
    sending a second session initiation protocol RE-INVITE message to the second user device in response to the call screening termination message.

8. The storage device as defined in claim 7, wherein the call screening termination message is a session initiation protocol REFER message.

9. The storage device as defined in claim 6, wherein the operations further comprise:
    sending a call screening initiation message to the messaging server in response to the call screening indication message received from the first device, the call screening initiation message to initiate the call screening session, the call screening termination message to cause the call screening session to be terminated.

10. The storage medium as defined in claim 6, wherein initiation of the communication session releases a media resource of the messaging server.

11. An apparatus comprising:
    a memory to store machine readable instructions; and
    a processor responsive to the machine readable instructions to perform operations comprising:
        initiating a call screening session in response to receiving a call screening indication message originated by a first voice over Internet protocol endpoint to initiate the call screening session, the call screening indication message originated by the first voice over Internet protocol endpoint while a call originated by a second voice over Internet protocol endpoint is being established with the first voice over Internet protocol endpoint;
        sending, to the first voice over Internet protocol endpoint, a communication session initiation message comprising a session initiation protocol INVITE message indicating session redirection and forwarding are prohibited, the communication session initiation message to establish the call screening session with the first voice over Internet protocol endpoint;

initiating a communication session between the first voice over Internet protocol endpoint and the second voice over Internet protocol endpoint in response to a call screening termination message received from a messaging server, initiation of the communication session to cause a signaling resource of the messaging server to be released, the first voice over Internet protocol endpoint and the second voice over Internet protocol endpoint having been involved in a call screening session that used the signaling resource.

12. The apparatus as defined in claim 11, wherein the operations further comprise:

sending a first session initiation protocol RE-INVITE message to the first voice over Internet protocol endpoint in response to the call screening termination message; and sending a second session initiation protocol RE-INVITE message to the second voice over Internet protocol endpoint in response to the call screening termination message.

13. The apparatus as defined in claim 12, wherein the call screening termination message is a session initiation protocol REFER message.

14. The apparatus as defined in claim 11, further comprising a session initiation protocol interface to:

send a call screening initiation message to the messaging server in response to the call screening indication message received from the first voice over Internet protocol endpoint, the call screening initiation message to initiate the call screening session, the call screening termination message to cause the call screening session initiated by the call screening initiation message to be terminated.

15. The apparatus as defined in claim 11, wherein initiation of the communication session releases a media resource of the messaging server.

* * * * *